United States Patent [19]

Shutic et al.

[11] Patent Number: 5,482,556

[45] Date of Patent: * Jan. 9, 1996

[54] APPARATUS FOR MOUNTING AND MOVING COATING DISPENSERS

[75] Inventors: Jeffrey R. Shutic, Wakeman; Robert J. Holland, Avon; John F. Carlson, Sheffield Village, all of Ohio

[73] Assignee: Nordson Corporation, Westlake, Ohio

[*] Notice: The portion of the term of this patent subsequent to Jan. 4, 2011, has been disclaimed.

[21] Appl. No.: 126,482

[22] Filed: Sep. 24, 1993

Related U.S. Application Data

[63] Continuation-in-part of Ser. No. 959,993, Oct. 13, 1992, Pat. No. 5,275,659, which is a continuation of Ser. No. 594,320, Oct. 9, 1990, abandoned.

[51] Int. Cl.$^6$ ..................................... B05B 1/00
[52] U.S. Cl. ..................... 118/621; 118/64; 118/315; 118/323; 118/625; 118/631; 118/634; 118/668; 118/712; 239/690; 239/704
[58] Field of Search ........................ 118/315, 323, 118/326, DIG. 7, 621, 624, 625, 629, 631, 634, 64, 308, 309, 668, 314, 712; 239/690, 418, 694, 423, 700, 424, 704, 424.5, 706, 566; 901/43; 454/52

[56] References Cited

U.S. PATENT DOCUMENTS

| | | | |
|---|---|---|---|
| 2,900,950 | 8/1959 | Peeps | 118/680 |
| 2,949,239 | 8/1960 | Goyette | 239/120 |
| 2,979,273 | 4/1961 | Liebhart | 239/550 |
| 3,045,921 | 7/1962 | Heuschkel | 239/132.1 |
| 3,286,688 | 11/1966 | Blenman | 118/323 |
| 3,402,697 | 9/1968 | Kock | 118/624 |
| 3,621,815 | 11/1971 | Walberg | 239/694 |
| 3,730,433 | 5/1973 | Scharfenberger | 239/694 |
| 3,735,778 | 6/1973 | Garnier | 137/896 |
| 3,742,901 | 7/1973 | Johnston | 118/669 |
| 3,885,066 | 5/1975 | Schwenninger | 427/314 |
| 3,889,472 | 6/1975 | Guillaud | 60/698 |
| 3,940,061 | 2/1976 | Gimple et al. | 239/705 |
| 4,011,833 | 3/1977 | Hawkins | 118/323 |
| 4,357,900 | 11/1982 | Buschor | 118/631 |
| 4,504,014 | 3/1985 | Leuning | 239/433 |
| 4,509,694 | 4/1985 | Inculet et al. | 239/697 |

(List continued on next page.)

FOREIGN PATENT DOCUMENTS

| | | |
|---|---|---|
| 36408 | 6/1973 | Australia. |
| 0480663 | 4/1992 | European Pat. Off.. |
| 1307770 | 9/1962 | France. |
| 7103742 | 5/1971 | Germany. |
| 3510199 | 10/1986 | Germany. |
| 4243566 | 8/1992 | Japan. |

*Primary Examiner*—David L. Lacey
*Assistant Examiner*—Laura E. Edwards
*Attorney, Agent, or Firm*—Wood, Herron & Evans

[57] ABSTRACT

Apparatus for mounting and moving coating dispensers within the interior of a spray booth, and particularly the coating dispensers located above an object moving through the booth. A first embodiment comprises a dispenser housing having an aerodynamically shaped outer surface formed with a leading edge, a trailing edge and opposed generally curved sides. A second embodiment includes a dispenser housing an outer surface with a convexly curved leading edge, flat side walls and a flat bottom wall. A pair of support assemblies isolated from the booth interior mount the dispenser housings within the booth interior such that the leading edge of each dispenser housing faces the top of the spray booth and the trailing edge faces the objects moving through the booth. One or more coating dispensers are mounted at the trailing edge of the dispenser housings in a position to discharge coating material downwardly onto the object. Each support assembly carries one side of a dispenser housing and structure is provided for moving the dispenser housings and dispensers vertically, and the dispenser housings side-to-side and pivotally with respect to objects moving through the booth. A collision detector is also provided to shut the system down in the event of a collision between the apparatus and an object within the booth.

65 Claims, 8 Drawing Sheets

U.S. PATENT DOCUMENTS

| | | | |
|---|---|---|---|
| 4,544,570 | 10/1985 | Plunkett et al. | 427/475 |
| 4,598,870 | 7/1986 | Schloz | 239/696 |
| 4,613,528 | 9/1986 | Mueller | 427/421 |
| 4,630,777 | 12/1986 | Hollstein et al. | 239/707 |
| 4,660,771 | 4/1987 | Chabert et al. | 239/694 |
| 4,704,985 | 11/1987 | Rubinstein | 118/316 |
| 4,864,965 | 9/1989 | Okuda et al. | 118/323 |
| 4,872,417 | 10/1989 | Kuwabara et al. | 901/43 |
| 4,923,123 | 5/1990 | Rutz et al. | 239/694 |
| 4,951,600 | 8/1990 | Soshi et al. | 118/696 |
| 4,957,618 | 9/1990 | Andren | 209/303 |
| 4,977,000 | 12/1990 | Murayama et al. | 427/424 |
| 5,014,645 | 5/1991 | Cann et al. | 118/634 |
| 5,092,307 | 3/1992 | Behr et al. | 118/315 |
| 5,153,034 | 10/1992 | Telchuk et al. | 118/326 |
| 5,275,659 | 1/1994 | Shutic et al. | 118/315 |

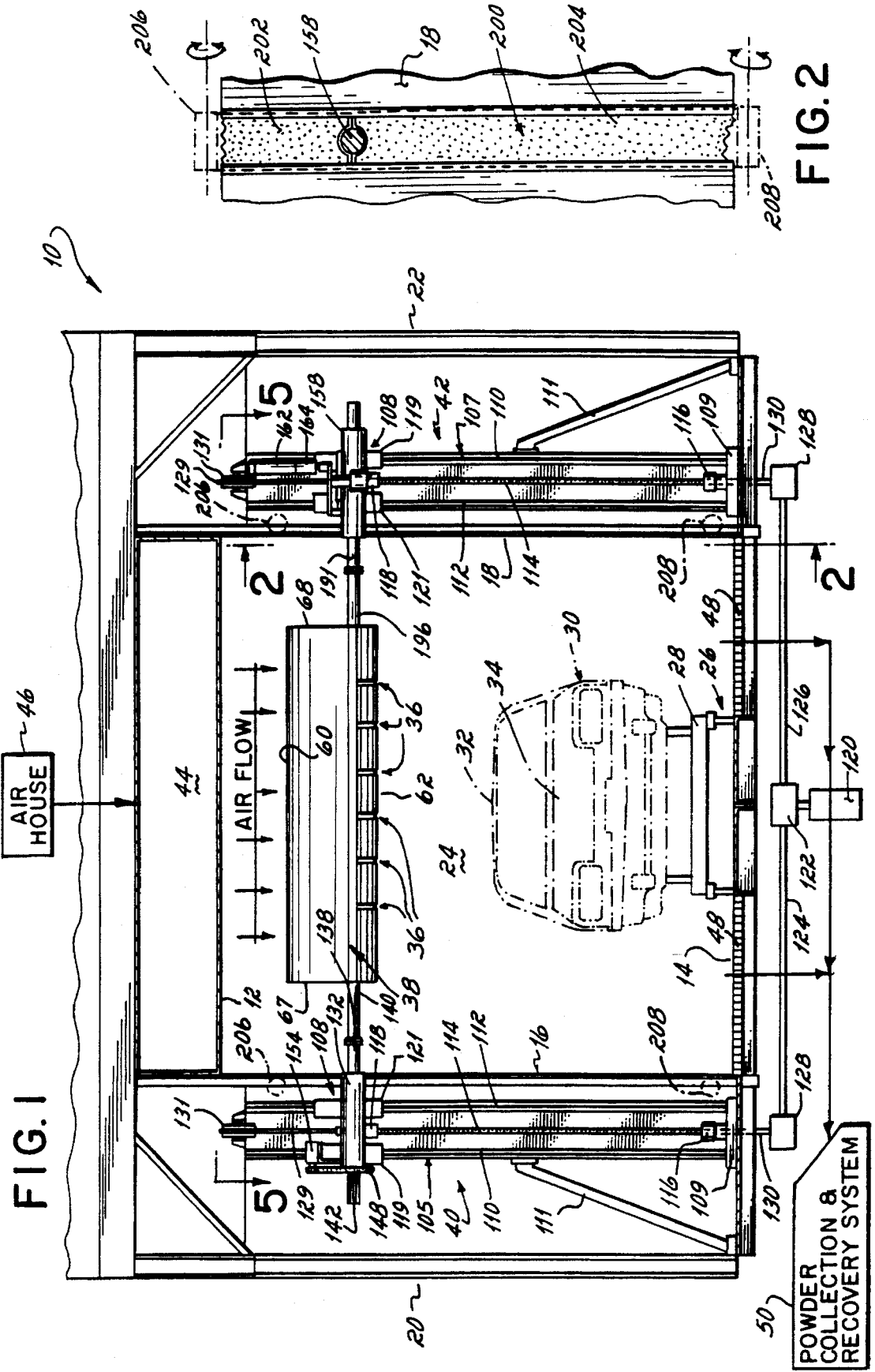

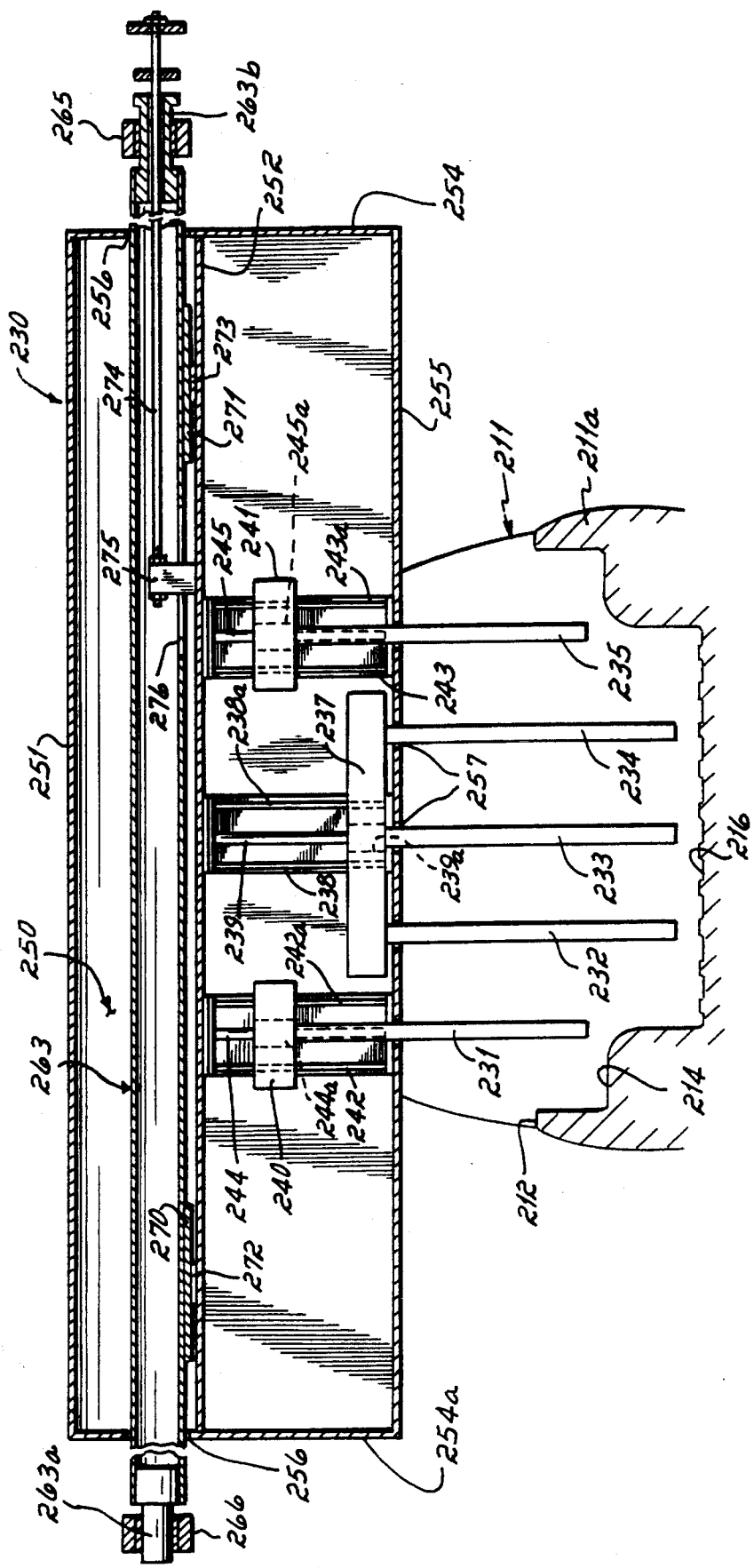

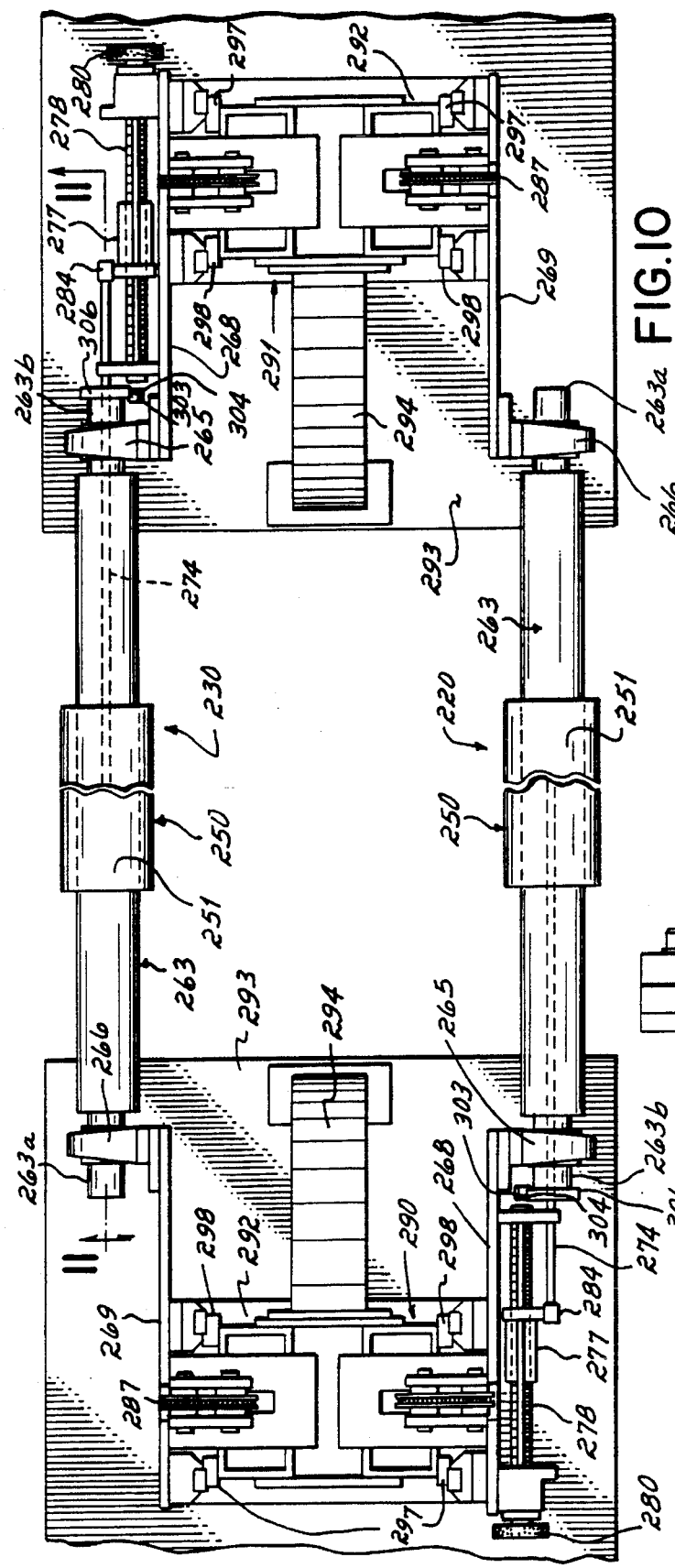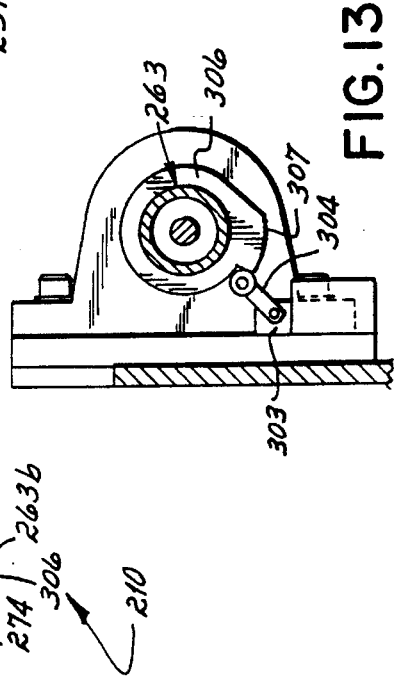

APPARATUS FOR MOUNTING AND MOVING COATING DISPENSERS

This application is a continuation-in-part of U.S. patent application Ser. No. 07/959,993 filed Oct. 13, 1992, now U.S. Pat. No. 5,275,659 which is a continuation of application Ser. No. 07/594,320 filed Oct. 9, 1990, now abandoned.

FIELD OF THE INVENTION

This invention relates to systems for dispensing coating material, and, more particularity, to an apparatus for mounting and moving coating dispensers within the interior of a spray booth.

BACKGROUND OF THE INVENTION

The application of coating materials to objects has conventionally been accomplished in spray booths having an elongated tunnel-like construction formed with an inlet for the ingress of the object, a coating application area, a curing or drying area in some designs and an outlet for the egress of the object. In some systems, "conditioned" air, i.e., tempered and filtered air, is introduced by a blower or feed fan into a plenum chamber at the top of the spray booth, and directed downwardly toward the floor of the booth. Alternatively, negative pressure is created within the booth interior which draws ambient air downwardly from the top of the booth to the floor. In either design, oversprayed coating material is entrained within this downward flow of air in the booth interior and delivered to a powder collection and recovery system at the base or sides of the booth where filters capture the oversprayed coating material and exhaust filtered or clean air to the atmosphere or back to the system for reuse.

In coating large objects such as vehicle bodies, both vertically and horizontally oriented surfaces must be coated as the object moves through the booth interior. For example, the fenders and doors of a vehicle body travel vertically through the spray booth, while the hood, roof and trunk areas of the vehicle body are oriented horizontally in the course of movement through the booth. In order to obtain a uniform coating on all of these surfaces, it has been the practice to provide one or more coating dispensers at the side walls of the spray booth to coat the vertically oriented surfaces of the vehicle body, and to mount one or more coating dispensers overhead near the top of the booth to dispense coating material downwardly onto the roof, hood and trunk areas of the vehicle body. Depending upon the size of the vehicle body, the number and location of coating dispensers utilized and a variety of other factors, mounting structure is needed to move both the side and overhead coating dispensers relative to the vehicle body in order to obtain the desired film build-up on all surfaces. In many instances, deposition of the coating material on the object is further enhanced by electrostatically charging the coating material as it is discharged from the dispensers and maintaining the vehicle bodies or other objects to be coated at a different or ground potential so that the charged coating material is electrostatically attracted to the objects.

One problem associated with the structure commonly employed for moving coating dispensers within the interior of spray booths involves the potential for contamination of the coating material as it is applied to the vehicle body or other object within the booth. In the past, the mechanisms for moving the side mounted and overhead mounted coating dispensers have been exposed within the spray booth interior. This can create contamination of the coating material as it contacts the lubricated connections and drive structures associated with the dispenser moving devices. Additionally, the lines which supply coating material to the dispensers, and, in some designs, the lines which carry high voltage electrostatic cables to the dispensers, are also commonly exposed within the interior of the booth. In powder applications, these utility lines can create further contamination of the coating material by abrasion and fall-out of nonatomized powder onto the substrate. Further problems and harmful effects on coating system components have resulted from their continuous contact with the coating material within the booth.

Another problem with devices currently utilized to move coating dispensers involves the creation of air turbulence within the booth interior. Turbulence is of particular concern when powder coating material is utilized as a replacement for high solids, liquid paint material. Powdered resin coating material presents different physical properties and is much lighter in weight than atomized liquid paint particles, and is discharged from a dispenser in a cloud-like pattern onto the object to be coated. It has been found that in applying low density, lightweight powder material onto a vehicle body, and particularly its horizontal surfaces such as the hood, roof and trunk, systems for moving the coating dispensers up and down, side-to-side and/or pivotally with respect to such surfaces can result in the creation of turbulence within the booth interior. That is, the downward flow of air within the booth interior which entrains oversprayed coating material becomes turbulent as the structure supporting the overhead coating dispensers is moved with respect to the object to be coated. This turbulence can create an inconsistent film build-up on the object because it disrupts the flow of powder material between the coating dispensers and the object to be coated.

Further problems with devices currently utilized to move coating dispensers involves damage and down time resulting from collisions between the coating devices and the objects moving through the spray booth. These collisions generally occur due to human error during initial set up or process variations introduced up-line of the spraying operation. For example, one common reason for such collisions involves the input of improper information concerning the type and/or size of the object to be coated within the spray booth. When improper information is input into the control system of the coating device, its movements within the spray booth do not correctly correspond to the size and shape of the objects moving through the booth. This will often result in a collision between the coating dispensers or other parts of the coating device an object moving through the booth. Such collisions obviously result in costly damage to both the coating device and the objects moving through the spray booth. Moreover, these collisions result in significant down time necessary for repairing the objects and coating dispensers involved in the collision. Photo-optic collision detection systems have been successfully utilized in liquid coating applications, however, photo-optic based systems are generally not suitable for use in powder coating applications due to the retroreflective nature of powder coating material.

Also, past spray coating devices lack the ability to move the overhead coating dispensers in a manner which most efficiently and effectively applies coating material to objects having concave shapes, convex shapes and/or objects having varying widths. While past mounting structure has allowed both vertical and side-to-side movement of coating dispensers as a unit, this structure has failed to provide for vertical movement of one or more coating dispensers with respect to other coating dispensers rigidly attached to the vertically movable mounting structure as well as with respect to the mounting structure itself and has also failed to provide for vertical movement of one end of the mounting structure with respect to the other. Regarding objects having varying widths, past mounting structure has lacked the ability to change the oscillation or reciprocation stroke of the side-to-side movement of the coating dispensers "on the fly" or during oscillatory movement thereof to quickly and efficiently coat such objects during their movement through the booth and to prevent significant waste of coating material caused by excessive overspray.

SUMMARY OF THE INVENTION

It has therefore been one objective of this invention to prevent contaminants from being introduced into the coating material being applied within the interior of a spray booth.

It has been another objective of the invention to prevent coating material from contacting and adversely affecting components of a coating apparatus.

It has been still another objective to minimize air turbulence within the booth interior as the coating dispensers are moved with respect to an object moving through the booth.

It has been a still further objective of the invention to prevent or minimize damage to both the coating dispenser apparatus and the objects being coated in the event that a collision occurs between the apparatus and the objects moving through the booth.

It has been still a further objective of the invention to provide a collision detection system which operates successfully in both liquid and powder coating environments.

It has been yet another objective of the invention to more effectively apply coating material to concavely shaped objects such as pick-up truck beds moving through the booth.

It has been a further objective of the invention to more effectively apply coating material to convexly shaped objects moving through the booth.

It has been still another objective of the invention to more efficiently apply coating material to objects moving through the spray booth which have a varying width.

It has been still another objective of the invention to provide a dispenser housing formed substantially entirely from non-conductive materials.

These and other objectives are accomplished in apparatus for moving coating dispensers within the interior of a spray booth, and particularly the coating dispensers located above an object moving through the booth, in which a first preferred embodiment comprises a dispenser housing having an aerodynamically shaped outer surface formed with a leading edge, a trailing edge and opposed generally curved sides. A pair of support assemblies isolated from the booth interior mount the dispenser housing in a position such that its leading edge faces the top or ceiling of the spray booth and its trailing edge faces the objects moving through the booth. One or more coating dispensers are mounted at the trailing edge of the dispenser housing in a position to discharge powder coating material downwardly onto the object, such as the hood, roof and trunk of a vehicle body. Each support assembly carries one side of the dispenser housing and structure is provided on at least one of the support assemblies for moving the dispenser housing vertically, side-to-side and pivotally with respect to objects moving through the booth.

An important aspect of each embodiment of this invention is predicated upon the concept of providing a dispenser housing having an aerodynamically shaped outer surface which reduces turbulence adjacent and below the housing and about the substrate being sprayed. In the first embodiment, the outer surface of the dispenser housing is formed in the general shape of an air foil wherein the leading edge has a smoothly convexly curved shape, the trailing edge tapers inwardly in a generally triangular shape, and the sides are generally curved from the leading edge toward the trailing edge. In the second embodiment, the outer surface of the dispenser housing includes a leading edge having a convexly curved and preferably semicylindrical shape, a trailing edge which is flat and generally perpendicular to the air flow within the booth, and flat side walls which are generally parallel to the air flow within the booth. While this design may be less "aerodynamic" than the dispenser housing of the first embodiment, the arcuate leading edge has been found to be aerodynamic enough to significantly decrease air turbulence within the booth while, especially in the application of powder spray coatings, this design tends not to cause the resulting air flow to "pinch" or restrict the spray pattern of the coating material. These aerodynamic shapes create a substantially laminar flow of the air moving therepast, Such laminar flow conditions in the area of the dispenser housing ensure that a minimum of turbulence is created between the coating dispensers at the trailing edge of the dispenser housing and the objects moving through the booth beneath the dispensers. Because powder coating material has such a low density and light weight, minimization of air turbulence within the booth interior is important to obtain a consistent film build-up on the horizontal surfaces of the objects to be coated.

Another important aspect of the first embodiment and of the second embodiment more fully described below is that the utility lines associated with the coating dispensers are completely contained within the interior of the dispenser housing, In the presently preferred embodiments, the supply lines which feed powder coating material to the coating dispensers and the lines which carry either high voltage electrostatic cables to charging electrodes or low voltage cables to multiplier assemblies associated with each coating dispenser, are all located inside of the dispenser housing and are isolated from the booth interior. Additionally, such utility lines are fed to the dispenser housing through hollow support tubes connected between each support assembly and an end of the dispenser housing which further isolates the utility lines from the booth interior. This avoids contamination of the coating material discharged from the coating dispensers by, for example, non-atomized overspray fall-out from exposed or external utilities.

Contamination of coating material within the booth interior by the structure for moving the dispenser housing is also eliminated by the present invention. Each support assembly is located within a space formed between an inner wall of the spray booth and an outer wall thereof. The objects to be coated are moved through the area between the inner walls of the booth for coating, and the column supports are isolated from this coating area or spraying chamber except for the support tubes extending therefrom to one side of the dispenser housing. Preferably, a movable seal is formed between these support tubes and the inner walls of the booth to permit vertical movement of the dispenser housing within the booth interior while sealing the support assemblies from the spraying chamber.

In the presently preferred embodiments, each of the support assemblies on opposite sides of the spray booth includes at least one vertical column which mounts a carriage having linear ways which mount a carriage movable vertically therealong. Each carriage mounts one of the support tubes which are connected to an end of the dispenser housing. The carriage on each vertical column is effective to move the dispenser housing vertically with respect to objects within the booth, and additional structure is provided on the carriage associated with at least one of the vertical columns to move the dispenser housing side-to-side, i.e., along an axis which is preferably perpendicular to the movement of the objects in the booth, and, at least in the first embodiment, to pivot the dispenser housing about the perpendicular axis. Such vertical, side-to-side and pivotal motion of the dispenser housing is effective to position the coating dispensers at the desired location with respect to objects moving through the booth to obtain the desired film build-up on all horizontally oriented surfaces. Preferably, each support assembly includes two vertical columns so that two dispenser housings can be provided within the spraying chamber of the booth, and it is contemplated that essentially any number of support assemblies could be employed in a booth of given dimensions depending upon the requirements of a particular application.

Aside from achieving many of the objectives of the first embodiment of this invention, the second embodiment achieves further objectives of the invention and comprises an apparatus especially designed for applying coating material to a pick-up truck bed. To this end, the dispenser housings are each provided with a plurality of coating dispensers which are movable in the vertical direction with respect to one another and with respect to the dispenser housing which carries them. Thus, once the carriages move the dispenser housing vertically to an initial starting position with respect to the top edge of the pick-up truck bed, selected coating dispensers are independently moved downwardly into the bed to coat the floor of the bed while the remaining coating dispensers are left in the initial position so as not to contact the upper horizontal edges of the bed. Thus, the required vertical stroke length of the dispenser housing is reduced due to the independent vertical movement of at least some of the coating dispensers themselves.

Another aspect of the second embodiment involves the mechanism for moving the dispenser housing side-to-side or along an axis perpendicular to the movement of the objects within the booth. In this regard, one of the carriages includes a ball screw which is rotated by a servo motor and which receives a ball nut rigidly secured to a push rod extending into the dispenser housing support tube. The dispenser housing is mounted for linear movement along the axis of the support tube and is rigidly connected to the push rod such that the push rod moves the dispenser housing side-to-side when the servo motor is actuated and continuously reversed. By way of this design, the stroke length of the side-to-side movement of the dispenser housing may be changed "on the fly" or during the side-to-side reciprocating movement thereof merely by changing the point during the reciprocation stroke at which the servo motor is reversed. The continuous reversal of the servo motor may be programmed into the control system of the apparatus to coincide with changes in the width of the objects moving through the booth. For objects of constant width, the control system is programmed to reverse the servo motor after a predetermined number of rotations thereof corresponding to the constant stroke length of the housing.

Limit switches are provided just outside the outer limits of each forward and reverse stroke as a back-up safety feature to prevent over travel in case of some type of control system failure such as a malfunction in the software of the system. If one of the limit switches is tripped, the servo motors are stopped and the operator is notified, for example, by annunciator such as an alarm and/or emergency light.

The dispenser housing support tube is mounted at opposite ends thereof within pillow blocks which allow the support tube ends to move vertically with respect to each other such that one end of the dispenser housing is lower than the other. To effect this independent vertical movement of each end of the support tube, the carriages at opposite ends of the support tube are moved up or down on the vertical columns with respect to each other such that one carriage is below the other. Because the pillow blocks allow movement of the support tube and therefore the dispenser housing in this manner, and because the vertical movement of each carriage is independently controlled by a separate servo motor, the carriages may be programmed for independent vertical movement which causes the coating dispensers to dispense coating material along a path which is concavely shaped in a direction perpendicular to the path of an object's movement through the booth. This feature of the invention can be used to significantly increase the quality of a coating being applied to a convexly shaped surface, such as a vehicle body having a roof or hood which is significantly convex in shape across its width.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a partial elevational view of one end of the spray booth incorporating the dispenser moving apparatus of the first embodiment of the invention;

FIG. 2 is a side view of an interior wall of the spray booth taken generally along line 2—2 of FIG. 1;

FIG. 10 is a top view of the dispenser moving apparatus of the second embodiment viewed generally along line 10—10 of FIG. 9;

FIG. 11 is a cross-sectional view of the second dispenser housing of the second embodiment taken generally along line 11—11 of FIG. 10;

FIG. 13 is a cross-sectional view taken generally along line 13—13 of FIG. 9.

DETAILED DESCRIPTION OF THE FIRST EMBODIMENT

General Organization of the First Embodiment

Figure 3:
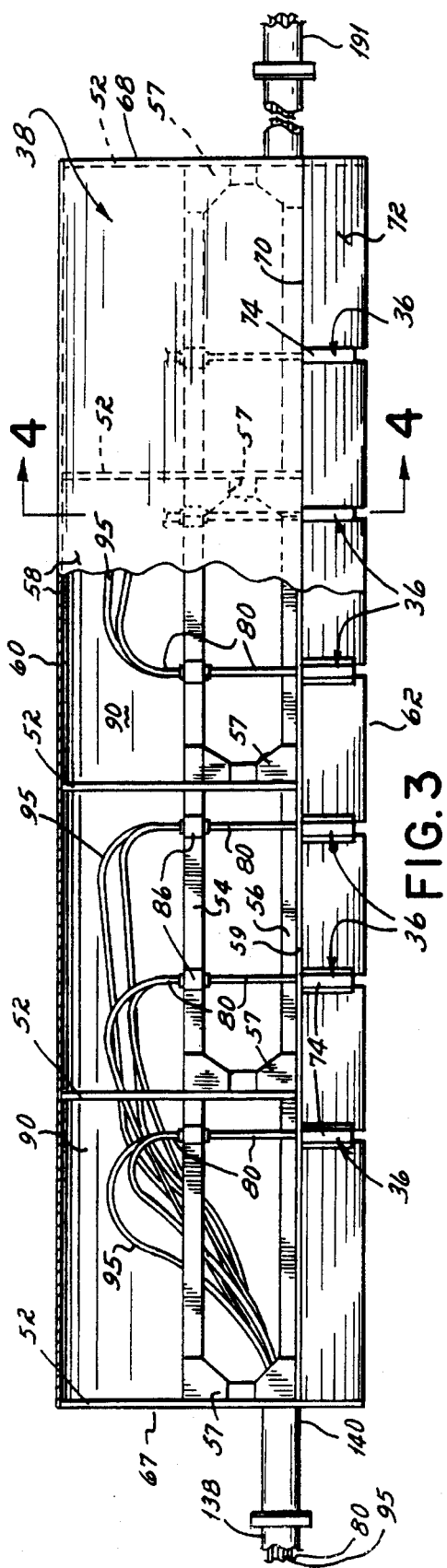
FIG. 3 is a partially broken away, elevational view of one of the dispenser housings of this invention.

With reference to FIG. 1, a first embodiment of the invention comprises a powder spray booth 10 including a ceiling 12, floor 14, opposed inner side walls 16, 18, and opposed outer side walls 20, 22. A spraying chamber 24 is formed between the inner side walls 16, 18, floor 14 and ceiling 12 which defines a controlled spray application area within which to apply powder coating material onto objects as described in detail below, In the embodiment illustrated in FIG. 1, a carrier 28 located atop a conveyor 26 supports a vehicle body 30 for movement through the spraying chamber 24 of booth 10, As described in more detail below, the subject matter of this first embodiment of the invention is particularly directed to applying powder coating material onto the generally horizontally oriented surfaces of a vehicle body 30 including the roof 32, trunk 34 and hood (not shown). The powder material is dispensed from a number of dispensers 36 carried in dispenser housings 38 and 38A described in detail below. Each dispenser housing 38, 38A is mounted within the spraying chamber 24 overhead or above the horizontal surfaces of the vehicle body 30. A pair of support assemblies 40 and 42, the structure and operation of which is described in detail below, position each dispenser housing 38, 38A within the spraying chamber 24. In the embodiment of spray booth 10 illustrated in FIG. 1, a flow of "conditioned" air, i.e., filtered and humified air, is directed downwardly toward the base of the booth 10 from a plenum 44 mounted at the ceiling 12. The conditioned air is supplied to the plenum 44 from an air house 46 illustrated schematically in FIG. 1. In the course of movement from the plenum 44 toward the booth floor 14, the conditioned air picks up or entrains oversprayed powder material which has been discharged from the dispensers 36, but does not adhere to the vehicle body 30. The air entrained powder material is drawn through gratings 48 at the floor 14 of the booth 10 into a powder collection and recovery system 50 located beneath the floor 14.

The detailed construction of the booth 10, including the air house 46 and powder collection and recovery system 50, form no part of this invention per se and are thus not described herein. Reference should be made to U.S. patent application Ser. No. 07/510,295, filed Apr. 16, 1990 now U.S. Pat. No. 5,078,084, and entitled "Powder Coating System" for a detailed discussion of same, the disclosure of which is incorporated by reference in its entirety herein.

Dispenser Housings of the First Embodiment

Figure 4:
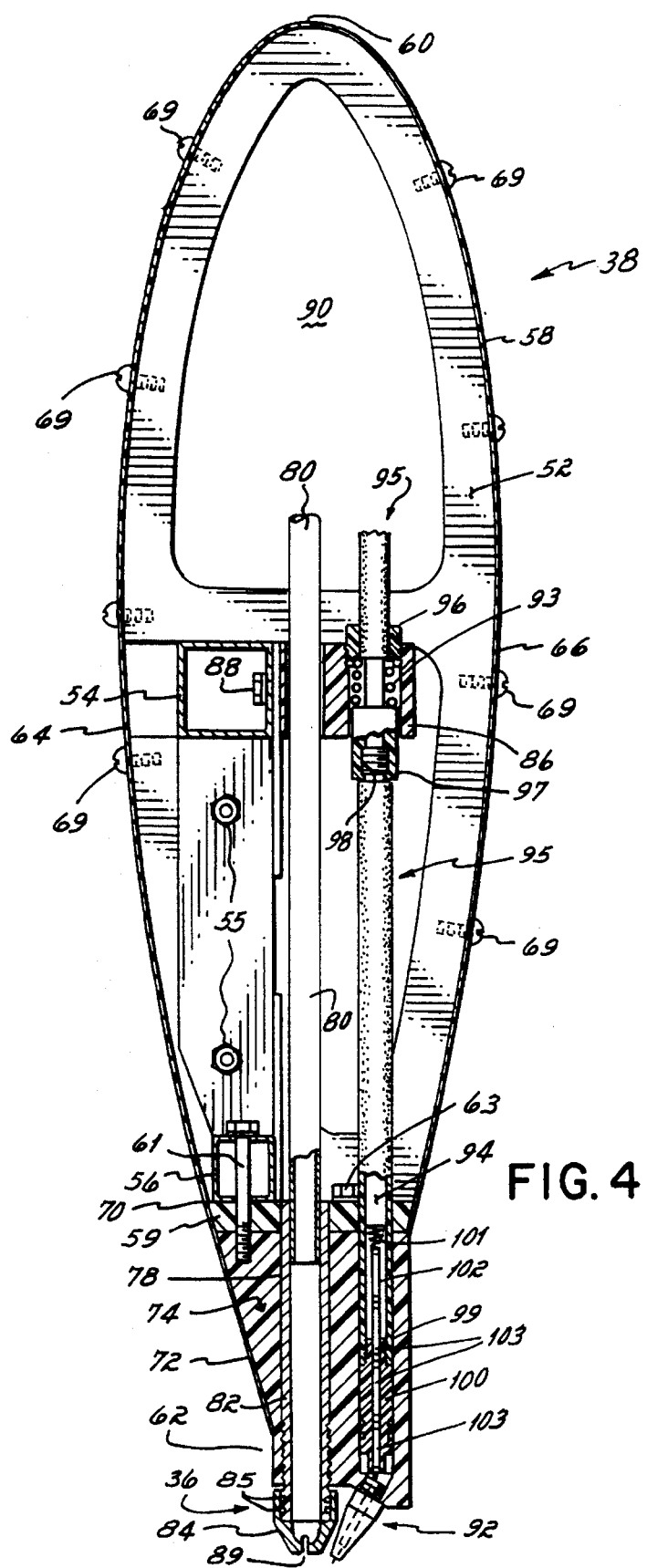
FIG. 4 is a cross-sectional view of the dispenser housing herein taken generally along line 4—4 of FIG. 3.

Referring now to FIGS. 3 and 4, the construction of the dispenser housing 38 is illustrated in detail, it being understood that the structure and operation of dispenser housing 38A is identical. The dispenser housing 38 comprises an internal frame structure including a series of longitudinally spaced, vertically oriented posts or ribs 52 connected between a longitudinally extending upper spar 54 and a parallel, lower spar 56. The spars 54, 56 are interconnected at longitudinally spaced intervals by brackets 57 fixedly mounted thereto, and each of these brackets 57 mount one of the ribs 52 such as by bolts 55 or other suitable fasteners. A plate 59 is mounted to the lower spar 54 by bolts 61. The frame structure supports an aerodynamically shaped outer surface or skin 58, preferably formed of a non-conductive material, defining a leading edge 60, a trailing edge 62, opposed sides 64 and 66 extending between the edges 60, 62 and opposed ends 67 and 68. The outer skin 58 is attached to the posts 52 by screws 69 or other suitable fasteners.

With reference to FIG. 4, the "aerodynamic shape" of the outer skin 58 of dispenser housing 38 resembles an air foil, such as an airplane wing. The leading edge 60 has a generally arcuate shape, the trailing edge 62 tapers inwardly and each of the sides 64, 66 are curved in a generally convex shape along at least a portion of their length. In this first embodiment, each of the sides 64, 66 has a radially outwardly curved shape from the leading edge 60 of the outer skin 58 to approximately the upper spar 54, and a radially inwardly curved shape from the upper spar 54 to a location 70 near the lower spar 56. Preferably, each side 64 and 66 has a straight portion 72 extending from the location 70 to the lowermost portion of the trailing edge 62, forming a generally triangular-shaped area at the lower portion of dispenser housing 38.

A number of longitudinally spaced, dispenser bodies 74 are mounted to plate 59 at the lower, triangular-shaped portion of the dispenser housing 38 by the bolts 61 and 63. See FIG. 4. Each dispenser body 74 is formed with a bore 78 which receives a powder supply tube 80. The lowermost end of the powder supply tube 80 is affixed within the bore 78 by a non-conductive nozzle adaptor 82 which is threaded into the base of bore 78. The nozzle adaptor 82 has an outwardly extending end which mounts a powder spray nozzle 84 secured thereto by 0-rings 85. The lower end of the powder supply tube 80 is spaced from the nozzle 84 a sufficient distance so as not to effect the electrostatic charging of the powder. The upper end of the powder supply tube 80 is carried within a bore formed in a mounting block 86 fixed by one or more bolts 88 to the upper spar 54. As described in more detail below, the powder supply tube 80 for each dispenser 36 is carried within a service cavity 90 extending along the length of the dispenser housing 38, and then through mounting structure (to be described) associated with the support assemblies 40 or 42 to a location outside of the spray booth 10. In this manner, the powder supply tube 80 is completely isolated from the spraying chamber 24 of booth 10.

The powder material is electrostatically charged prior to application onto the vehicle body 30 which enhances deposition of the powder material thereon. In order to impart an electrostatic charge to powder material dispensed from the nozzle 84, an electrode assembly 92 is mounted at the base of dispenser body 74 in a position proximate the discharge outlet 89 of nozzle 84. A high voltage electrostatic charge is transmitted to the electrode assembly 92 by an electrostatic cable 94 carried within a dielectric tube 95 which extends through the service cavity 90 of dispenser housing 38 to the mounting block 86 where it is mounted by a retainer 96. The dielectric tube 95 is separated at the mounting block 86 forming an upper end carried by the retainer 96, and a lower end which abuts a sleeve 97 slidably received within the mounting block 86. This sleeve 97 has internal threads 98 fixedly attached to the electrostatic cable 94 within the dielectric tube 9,5, The dielectric tube 95 extends downwardly from the sleeve 97, as viewed in FIG. 4, into a bore 99 formed in dispenser body 74 where it is threadedly connected to a dielectric block 100 which is also carried within bore 99.

A coil spring 93 extends between the fixed retainer 96 and movable sleeve 97 to urge the electrostatic cable 94 downwardly as viewed in Fig, 4 toward the dispenser body 74. A spring 101 mounted at the lowermost end of electrostatic cable 94 is thus forced into electrical contact with a resistor 102 carried within the lowermost portion of the dielectric tube 95. This resistor 102 is in contact with other resistors 103 which are carried end-to-end and potted within the dielectric block 100 thus forming a completed electrical path to the electrode assembly 92. Preferably, a dielectric material such as grease is provided within the dielectric tube to encase the resistor 102 and/or resistors 103 to reduce the possibility of a corona discharge within the dispenser body 74.

Figure 5:
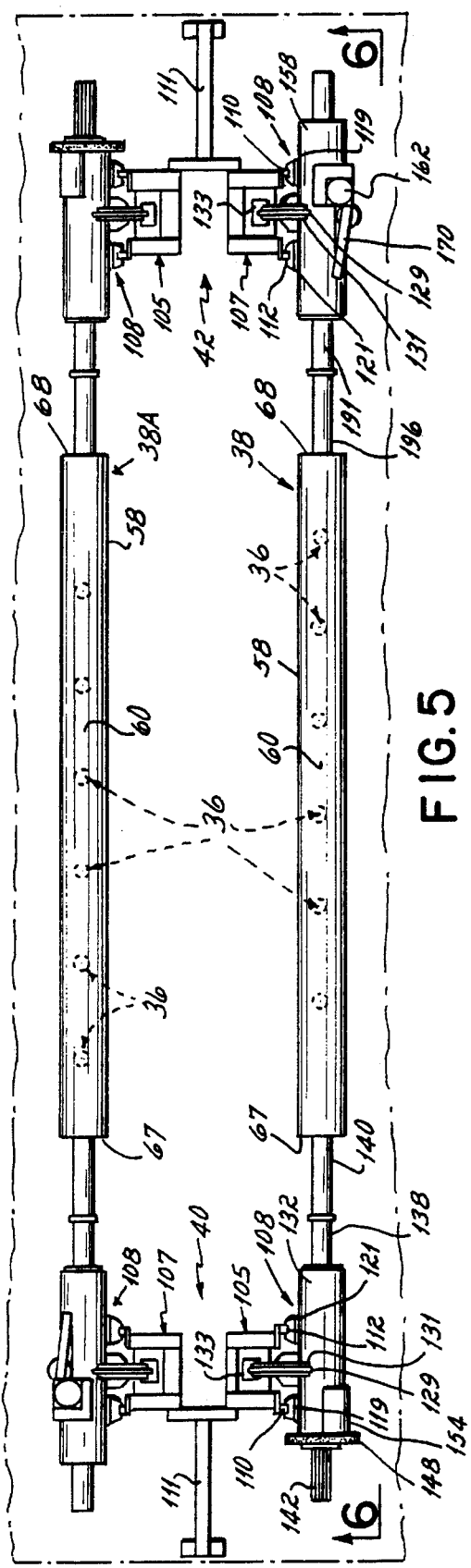
FIG. 5 is a view taken generally along line 5—5 of FIG. 1.

Each dispenser 36 is effective to discharge a pattern of electrostatically charged powder material from the trailing edge 62 of dispenser housing 38 downwardly toward the horizontally extending surfaces of the vehicle body 30, As best shown in FIG. 5, the two dispenser housings 38 and 38A are spaced from one another in the direction of movement of a vehicle body 30 through the booth 10, and each carry a number of dispensers 36. Preferably, the dispensers 36 mounted to the first dispenser housing 38 are longitudinally offset from the dispensers 36 carried on the second dispenser housing 38A to ensure the spray pattern collectively obtained from the dispensers 36 on both housings 38, 38A completely covers all of the horizontal surfaces of the vehicle body 30.

One important advantage of the construction of dispenser housings 38 and 38A is that the powder supply tube 80 and dielectric tube 95 are completely confined within the interior of the dispenser housings 38, 38A to avoid any contamination of the environment within the spraying chamber 24 of the booth 10, As mentioned above, a separate powder supply tube 80 and dielectric tube 95 for each dispenser 36 is fed through mounting structure associated with the support assemblies 40, 42, as described below, into the service cavity 90 of the dispenser housing 38. No part of either the powder supply tube 80 or dielectric tube 95 is exposed within the spraying chamber 24,

Dispenser Housing Movement Of the First Embodiment

Referring now to FIGS. 1, 2 and 5–7, the structure for moving the dispenser housings 38, 38A, and, in turn, dispensers 36, is illustrated in detail. Because the horizontally oriented surfaces of the vehicle body 30 are at different vertical heights on the vehicle, and may have curved or other non-linear surfaces, it is desirable to provide for manipulation of the dispenser housings 38 and 38A so that the dispensers 36 carried thereon can be maintained at the desired elevation and angular position with respect to the horizontal surfaces to be coated. Accordingly, structure is provided for moving the dispenser housings 38, 38A vertically or up and down relative to the vehicle body 30; side-to-side or along a transverse axis 135 perpendicular to the direction of movement of the vehicle body 30 through the booth 10; and, pivotally relative to the vehicle body 30 wherein the dispenser housing 38 is pivoted about the transverse axis. See FIG. 6.

As mentioned above, each of the support assemblies 40 and 42 mounts one end of the two individual dispenser housings 38 and 38A. Each support assembly 40 and 42 comprises back-to-back vertical columns 105 and 107 which are bolted to a common base 109 and held in an upright position by an angled brace 111 extending from the floor 14 of booth 10. See FIGS. 1 and 5. Preferably, the vertical column 105 of support assembly 40 mounts one end of dispenser housing 38, and the opposite end of dispenser housing 38 is carried by the vertical column 107 of support assembly 42. Similarly, the vertical column 107 of support assembly 40 mounts one end of dispenser housing 38A and the vertical column 105 of support assembly 42 mounts the opposite end of dispenser housing 38A. Each of the vertical columns 105 include structure for pivoting one of the dispenser housings 38, 38A, and the vertical columns 107 each include structure for moving one of the dispenser housings 38, 38A in a side-to-side direction. All vertical columns 105, 107 have the same structure to effect vertical movement of the dispenser housings 38, 38A. For purposes of the present discussion and ease of illustration, FIGS. 5–8 include details of the vertical column 105 associated with support assembly 40 and of vertical column 107 associated with support assembly 42, which are employed to move dispenser housing 38. It should be understood that the other vertical columns 105, 107 for moving dispenser housing 38A are identical in structure and function.

With respect to vertical movement of the dispenser housing 38, each of the vertical columns 105 and 107 mount a carriage 108 which is vertically movable along a linear way 110 and 112, such as manufactured by Nook mounted to vertical columns 105, 107. A threaded ball screw 114 extends along the length of each vertical column 105, 107 which is rotatably carried at opposite ends by bearings 116 (the lower one only being shown). Each carriage 108 includes a pair of brackets 119, 121 which engage the linear ways 110, 112 and mount a ball nut 118 in mating engagement with the threaded ball screw 114 such that rotation of the ball screw 114 causes the nut 18, and, in turn, the carriage 108, to move vertically along the linear ways 110, 112 of support column 40 or 42.

Rotation of each ball screw 114 is obtained by a drive structure illustrated at the bottom of FIG. 1. A motor 120 is drivingly connected to a gear reducer 122 whose output is connected to a first drive shaft 124 and a second drive shaft 126. The opposite end of each drive shaft 124, 126 is connected to a 90° bevel gear 128 connected to an unthreaded extension 130 of the ball screw 114 of each vertical column 105 and 107. In response to operation of motor 120, the ball screw 114 associated with each support column 105 and 107 are rotated in either the clockwise or counterclockwise direction to move the carriages 108 vertically upwardly or downwardly along the linear ways 110, 112 with respect to the vertical columns 105, 107. Preferably, one end of a cable 129 is attached to the top of carriage 108, and the cable 129 extends over a pulley 131 mounted at the too of each vertical column 105 and 107. The opposite end of cable 129 is attached to a counterweight 133 movable along the vertical columns 105, 107 which assists the above-described drive structure in moving the carriages 108 vertically upward along the vertical columns 105, 107.

With reference to the left hand side of Fig, 6, the structure associated with the vertical column 105 of support assembly 40 is illustrated. This structure is effective to rotate or pivot the dispenser housing 38 about a transverse axis 135 which is perpendicular to the direction of movement of a vehicle body 30 through the booth 10. In this first embodiment, a cylindrical tube 132 is mounted to the brackets 119, 121 of carriage 108 associated with support assembly 40. Bearings 136 are mounted within the interior of the tube 132 at each end and these bearings 136 rotatably carry a hollow support rod 138 having an inner end 140 connected to the dispenser housing 38. As illustrated in phantom in FIGS. 3 and 6, the utilities for the dispensers 36 carried by dispenser housing 38, e.g., the powder and electrical supply lines, extend through the hollow interior of support rod 138, into the service cavity 90 of dispenser housing 38 and then to the individual dispensers 36 as described above. This construction effectively isolates such utility lines from the spray chamber 24 of booth 10.

The opposite or outer end 142 of support rod 138 is splined and thus forms a splined connection with a timing pulley 146 which is rotated by a timing belt 148 extending between the timing pulley 146 and a second timing pulley 150 carried by the output shaft 152 of a motor 154. The motor 154 is supported on the carriage 108 by a bracket 156. Operation of the motor 154 is effective to rotate the timing pulley 146, and hence the support rod 138, so that the dispenser housing 38 and dispensers 36 carried thereon are pivoted about the transverse axis 135 to the desired angular position with respect of the horizontal surfaces of the vehicle body 30.

Figure 6:
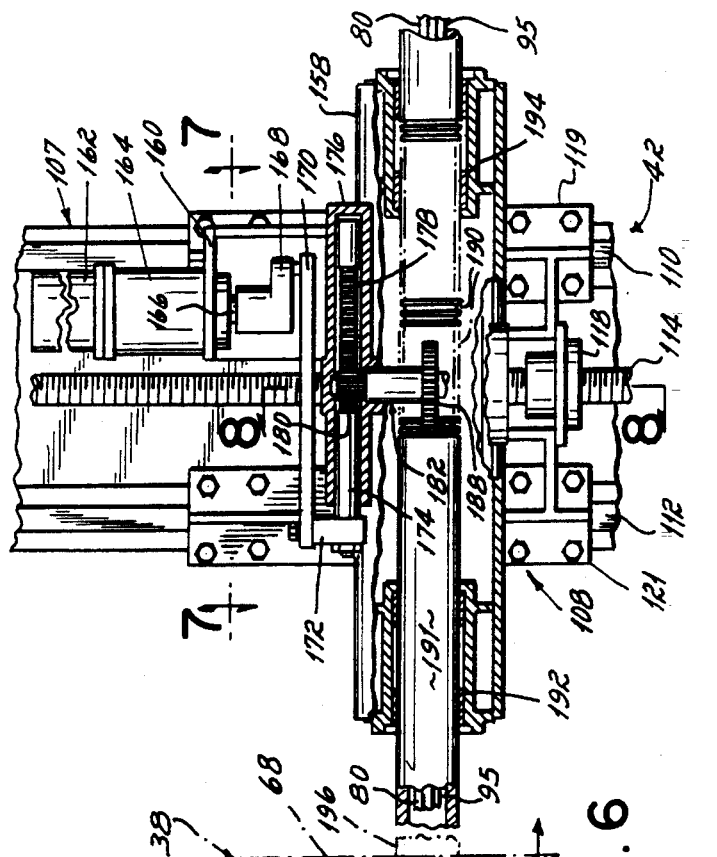
FIG. 6 is a schematic, partially broken away view taken generally along line 6—6 of FIG. 5.
Figure 7:
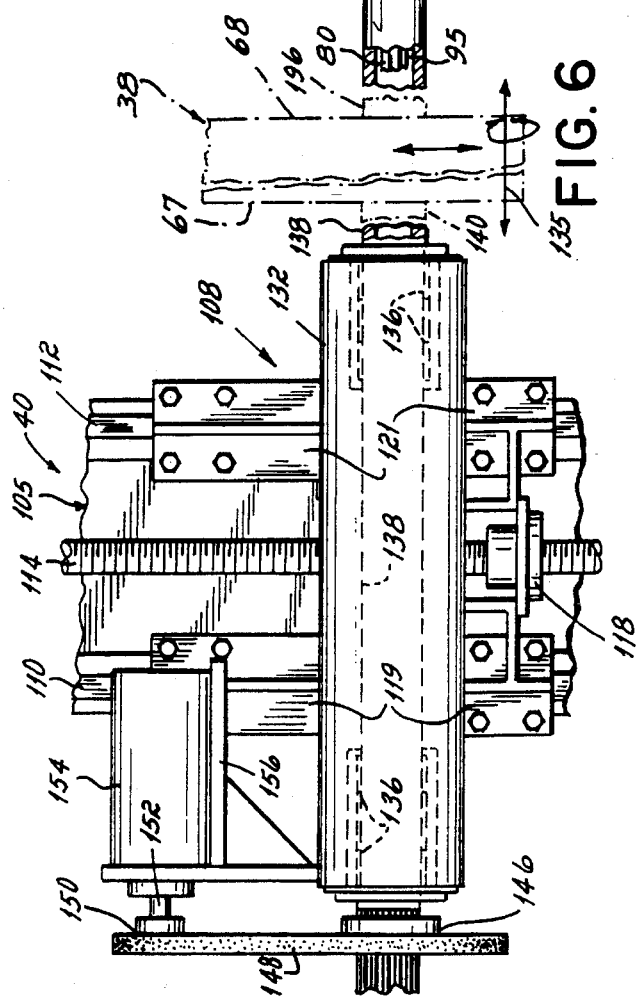
FIG. 7 is a cross sectional view taken generally along line 7—7 of FIG. 6.
Figure 8:
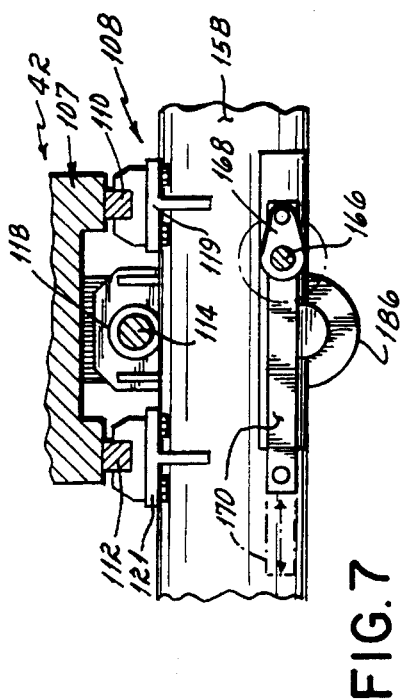
FIG. 8 is a cross sectional view taken generally along line 8—8 of FIG. 6.

Referring now to the right hand portion of FIG. 6, and to FIGS. 7 and 8, structure associated with the vertical column 107 is illustrated for moving the dispenser housing 38 side-to-side, i.e., parallel to the transverse axis 135.

The carriage 108 associated with vertical column 107 mounts a hollow tube 158 by brackets 119, 121 in the same manner as described above in connection with the tube 132 of vertical column 105. The carriage 108 also mounts a bracket 160 which carries a motor 162 drivingly connected to a gear reducer 164. The output shaft 166 of gear reducer 164, in turn, is drivingly connected by an eccentric 168 to one end of a crank arm 170. The opposite end of crank arm 170 is connected by a stub shaft 172 to a rod 174 slidably received within a cylinder 176 fixedly mounted to the external wall of tube 158, the cylinder 176 being parallel to the tube 158.

A portion of the rod 174 is formed with gear teeth 178 which mesh with the teeth 180 formed on one end of a rod 182 whose axis is normal to the axis of tube 158. The opposite end of rod 182 is journaled at 184 in a bracket 186 fixedly mounted to the wall of tube 158. See FIG. 8. The rod 182 mounts a gear 188 having teeth which mesh with annular grooves 190 formed in the outer surface of a cylindrical, hollow support rod 191 carried by bearings 192, 194 within the interior of the tube 158. The inner end 196 of rod 191 mounts the opposite or right hand end of dispenser housing 38 as viewed in FIG. 6, so that the dispenser housing 38 is supported at opposite ends in position above the vehicle body 30 moving through booth 10.

Side-to-side movement of the dispenser housing 38 is obtained with the above-described structure as follows. In response to operation of motor 162, the gear reducer 164, shaft 166 and eccentric 168, the crank arm 170 is moved in an eccentric path which resembles the motion of a crank arm employed to drive the wheels of a locomotive. See solid and phantom lines in FIG. 6. In turn, the rod 174 is moved by the crank arm axially in and out of the cylinder 176. This rotates the rod 182 in the clockwise and counterclockwise direction because of the connection between the gear teeth 178 of rod 174 and the teeth 180 of rod 182. Rotation of the rod 182, in turn, rotates the gear 188 carried thereon which meshes with the teeth of the annular rack 190. In response to rotational movement of the gear 188, the annular rack 190 is thus moved axially within the tube 158 in a side-to-side direction, i.e., along the transverse axis 135 perpendicular to the direction of movement of the vehicle bodies 30 through the booth 10. Such side-to-side movement of the annular rack 190 moves the support rod 191 and attached dispenser housing 38 side-to-side, and the support tube 138 connected to the opposite end of dispenser housing 38 is slidable within bearings 136 to permit such movement. Additionally, the splined connection at the outer end 142 of support tube 138 permits sliding movement of the support tube 138 relative to the timing pulley 146 without disrupting the rotatable connection therebetween as described above.

Each of the aforementioned movements of dispenser housing 38 are obtained while maintaining a seal between the spraying chamber 24 and support assemblies 40, 42. As shown in FIG. 2, the tube 158 which carries support rod 191 mounted to dispenser housing 38 extends through a movable seal 200 formed in the side wall 18. This seal 200 comprises a top curtain 202 and bottom curtain 204 which roll up within housings 206, 208, respectively at the top and bottom of side wall 16 much like window shades. The top and bottom curtains 202, 204 abut one another and sealingly engage tube 158. In response to vertical movement of tube 158, the curtains 202, 204 roll up within or extend from their respective housings 206, 208 depending upon the direction of vertical movement of tube 158. Additionally, the curtains 202, 204 are constantly urged toward one another, and into sealing engagement with tube 158, so that a seal is maintained with tube 158 during pivotal and side-to-side movement thereof. Each of the tubes 132 and 158 associated with the vertical columns 105 and 107 of support assemblies 40, 42 is provided with a seal 200.

General Organization of the Second Embodiment

Reference is now made to FIGS. 9–13 which illustrate a coating apparatus 210 being a second preferred embodiment of the present invention. As will also be mentioned where appropriate below, certain aspects of the first and second embodiments are identical and therefore these aspects are not described in detail with respect to the second embodiment of the invention. It will first be noted that although the second embodiment is not shown in the drawings as including a spray booth, it will be appreciated that the second embodiment of the invention is likewise preferably used in conjunction with a spray booth such as the spray booth 10 shown in FIG. 1. Thus, the complete enclosure provided by the spray booth 10 including the movable seal 200 as well as the air flow system 44, 46, 48 and the powder collection system 50 would, for example, also be provided for use with the coating apparatus 210 of the second embodiment.

As described more particularly below, the coating apparatus of this second embodiment, in its most specific application, is directed to the application of powder coating material onto the upwardly facing surfaces of the bed 211a of a pick-up truck body 211 including the upper side wall edges 212, the wheel wells 214 if desired, and the floor 216 of the bed 211a. As will be further detailed below, the apparatus 210 disclosed in the second embodiment may also be effectively used to coat other substantially flat, concave or convex surfaces of objects moving through the booth. Two coating dispenser housings 220, 230 are preferably utilized to most effectively coat the pick-up truck bed 211a moving through the isolated spray chamber 217 defined between walls 218. As previously mentioned, walls 218 incorporate the movable seal 200 disclosed in the first embodiment to maintain the isolated environment of the spray application area or spray chamber 217 during movement of the dispenser housing 220, 230. As shown best in FIGS. 10 and 12, and in a manner similar to the first embodiment, the first and second housing 220, 230 are spaced from one another in the direction of the movement of the pick-up truck body 211 through the spray chamber 217 and the dispensers 221–226 of housing 220 are longitudinally offset from the dispensers 231–235 of housing 230 to ensure complete coating coverage.

Dispenser Housings of the Second Embodiment

Figure 9:
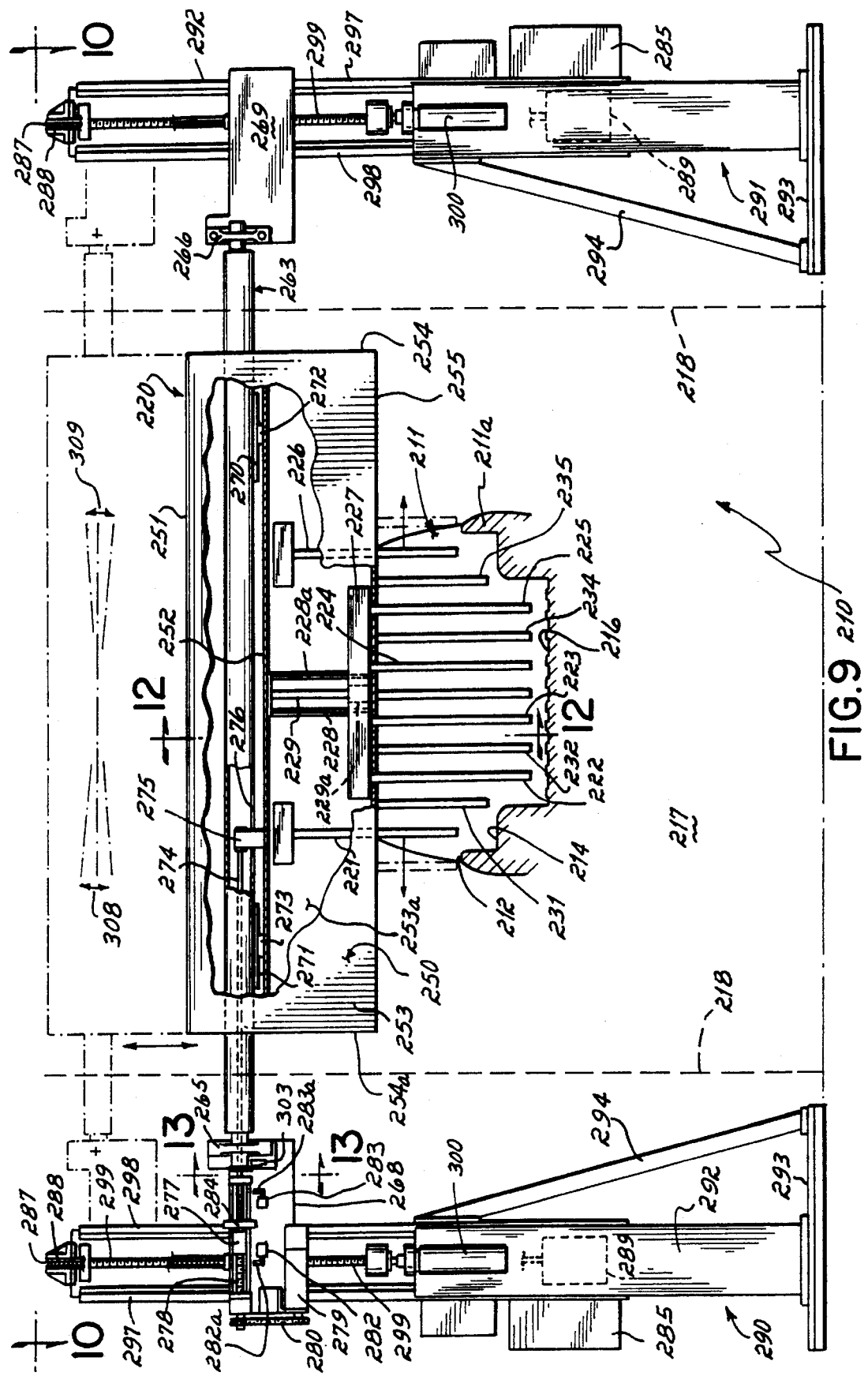
FIG. 9 is a diagrammatical elevational view of the coating dispenser moving apparatus of a second embodiment of the invention showing coating dispensers of the two coating dispenser housings lowered into a pick-up truck bed with the coating dispensers of one housing staggered with respect to the dispensers of the other housing.

As shown in FIG. 9, the first dispenser housing 220 carries six coating dispensers including two outer dispensers 221, 226 and four vertically adjustable inner dispensers 222, 223, 224, 225. As shown in FIG. 9, the four inner coating dispensers 222, 223, 224, 225 are each mounted to a bracket 227 which slides vertically along rails 228, 228a by way of linear bearing units (not shown) secured to the bracket 227. The bracket 227 is secured to the movable element 229a of a double-acting rodless pneumatic cylinder 229. The outer dispensers 221, 226 are rigidly secured to the dispenser housing 220 for movement therewith and, as detailed further below, are positioned to coat the upper side wall edges 212 of the pick-up truck bed 211a.

Referring briefly to FIG. 11, a second dispenser housing 230 carries five coating dispensers including two outer independently vertically adjustable coating dispensers 231, 235 and three inner coating dispensers 232, 233, 234 which are vertically adjustable independent of dispensers 231 and 235. The inner coating dispensers 232, 233, 234 are rigidly secured to a mounting bracket 237 in a manner identical to the inner coating dispensers 222, 223, 224, 225 carried by the first dispenser housing 220. Thus, the mounting bracket 237 slides along a pair of rods or rails 238, 238a by way of suitable linear bearing units (not shown). The support bracket 237 is rigidly secured to the movable element 239a of a rodless cylinder 239 which is of the same type as cylinder 229. Pneumatic actuation of the rodless cylinder 239 thus moves the support bracket 237 along with dispensers 232, 233, 234 in a vertical manner.

The two outer coating dispensers 231, 235 are connected to separate support brackets 240, 241 which are each vertically adjustable in the same manner as the central support bracket 237. That is, support bracket 240 slides along a pair of rods or rails 242, 242a by way of suitable linear bearing units (not shown). The bracket 240 is further secured to the movable element 244a of a rodless cylinder 244. Likewise, bracket 241 is adapted to side vertically along a pair of rods or rails 243, 243a and is rigidly secured to the movable element 245a of a rodless cylinder 245. Like the rodless cylinder 239, the rodless cylinders 244, 245 are each preferably double-acting pneumatically operated cylinders which receive pressurized air from air lines (not shown) leading into the respective housings 220, 230, for example, through the hollow support tube 263 to be described further below. Of course, other conventional types of actuators may be used in place of any one or all of the rodless cylinders. For example, such actuators may be electrically or hydraulically operated devices.

As will be further detailed below, the inner coating dispensers 232, 233, 234 carried by dispenser housing 230 are adapted to work in conjunction with inner coating dispensers 222, 223, 224, 225 to completely coat the floor or lower horizontal surface 216 of the pickup truck bed 211a. The outer coating dispensers 231, 235 carried by dispenser housing 230 are located so as to coat the outer side edge portions of the lower horizontal surface 216 but are vertically adjustable and controlled to "hop" or move upwardly over the wheel wells 214 as the pick-up truck bed 211 a moves past the outer coating dispensers 231, 235.

Aside from the coating dispensers 221–226 and 231–235 and their respective mountings, the dispenser housings 220, 230 are comprised of substantially identical structure. Therefore, like elements of structure of the two housings 220, 230 are represented by like reference numerals in the drawings and the further detailed description of housing 220 is intended to fully describe dispenser housing 230 as well.

Figure 12:
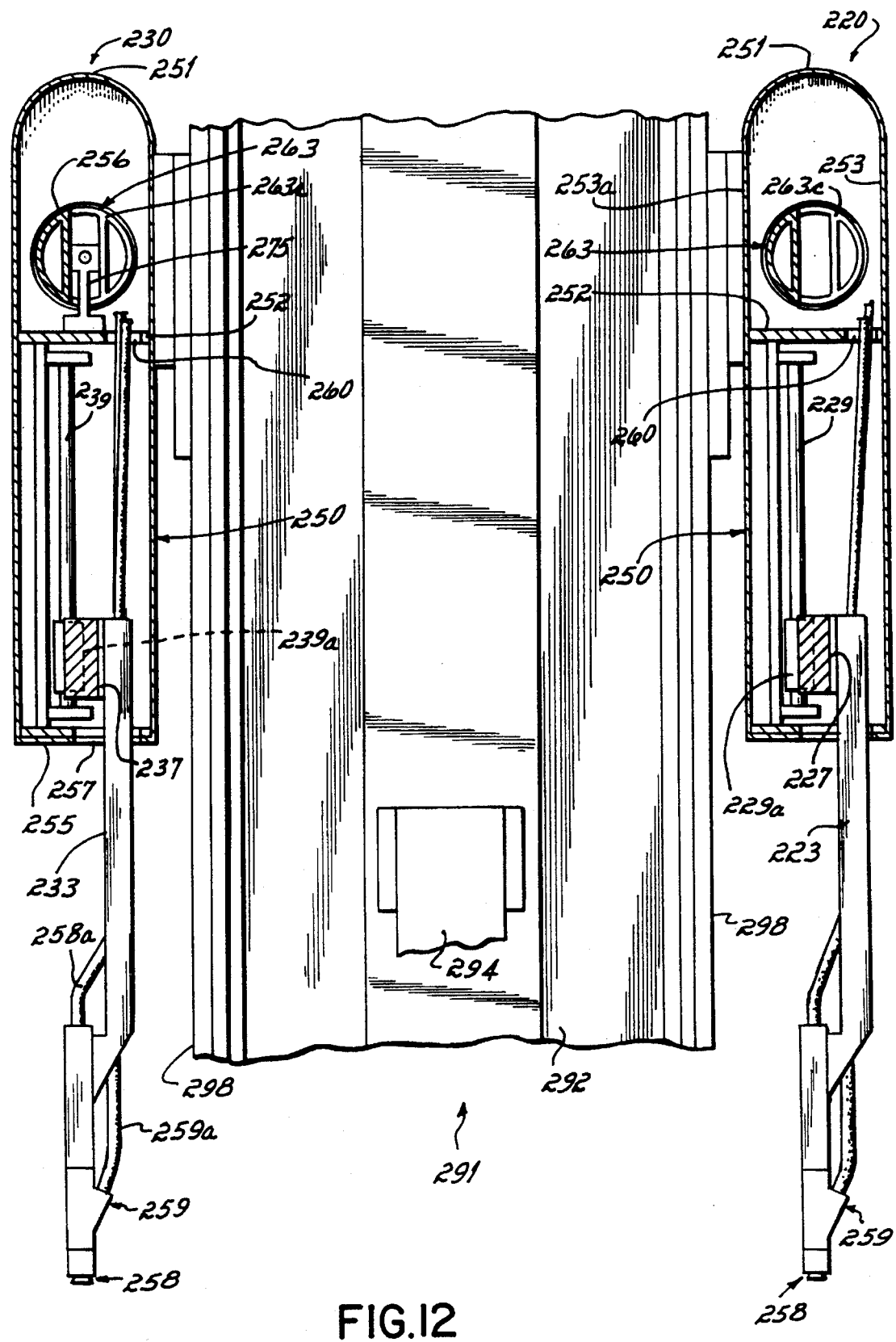
FIG. 12 is a cross-sectional view of both the first and second dispenser housings taken generally along line 12—12 of FIG. 9.

Referring now to FIG. 12, dispenser housing 220 is essentially comprised of a shell 250 which provides suitable structure for supporting all of the necessary coating dispensers 221–226 and other components associated with either the housing 220 or dispensers 221–226. Unlike the first embodiment which has a frame and skin construction, the shell 250 of the dispenser housing 220 is preferably formed entirely from a lightweight yet strong non-conductive composite material sold under the name "Nomex" and manufactured by E. I. DuPont De Nemours and Company. This material is comprised of a honeycomb core structure having smooth but rigid outer surfaces. The honeycomb core may be impregnated with a resin material wherever it is necessary to have support members or other components rigidly affixed to the shell 250 as by screws, bolts, etc. As specifically shown in FIG. 12, the dispenser housing shell 250 includes an upper convexly curved leading edge 251. Preferably, the leading edge 251 is semi-circularly shaped to promote laminar air flow in a direction from the top of the spray booth to the bottom thereof. Other arcuate shapes which promote laminar air flow may also be used for the leading edge 251.

Referring to FIGS. 9, 11 and 12, the dispenser housing shell 250 of each dispenser housing 220, 230 is further comprised of opposed vertical side walls 253, 253a extending from the arcuate leading edge 251 to a flat bottom wall 255. Opposite end walls 254, 254a also extend from the arcuate leading edge 251 to the bottom wall 255. While this design is different from the air foil shaped housing of the first embodiment, it has been found to sufficiently promote laminar air flow while preventing "pinching" or restricting the coating material spray pattern especially when using powder coating material. As specifically shown in FIGS. 11 and 12, the end walls 254, 254a each contain a hole 256 for receiving a support tube to be described further below. The holes 256 are sized such that a gap of approximately ⅛–¼ is created between the edge of the hole 256 and the outer surface of the support tube 263. This gap provides an exit for pressurized air which is directed into each dispenser housing shell 250 from a source (not shown) which may include one or more air lines extending into the housing shell 250 through the support tube 263. This pressurized air keeps atomized coating material from entering the shell 250 and possible damaging components such as the air cylinders 229, 239, 244, 245 contained therein. The bottom wall 255 of each dispenser housing shell 250 contains a plurality of holes 257 for the dispensers 221–226 and 231– 235 to extend through in the manner shown in FIG. 12 with respect to dispensers 223 and 233. The gaps provided between the edges of holes 257 and the dispensers 221–226 and 231–235 also provide exits for the pressurized air within the shells 250.

As further shown in FIG. 12 with respect to dispensers 223, 233, each of the dispensers 221–226 and 231–235 is comprised of a nozzle 258 and an electrode assembly 259 in the case of a powder coating application. The nozzle 258 is supplied with powder coating material through a supply tube 258*a* and the electrode assembly 259 supplies an electrostatic charge to the dispensed coating material by way of a dielectric tube 259*a* in the same manner as described in the first embodiment. The various coating material supply tubes 258*a*, dielectric tubes 259*a* and air supply tubes (not shown) all preferably enter the dispensers 220, 230 through the respective support tubes 263 such that they are completely isolated from the spray chamber 217. A section 263*c* of the support tube 263 is machined out to allow room for the various supply tubes and cables to be directed appropriately within the shell 250. Holes 260 in the horizontal support member 252 (described below) allow the powder supply tubes 258*a* and dielectric tubes 259*a*, for example, to be directed to the various dispensers 221–226 and 231–235.

Dispenser Housing Movement of the Second Embodiment

The general horizontal and vertical movement capabilities and structure for allowing such movement are the same as between the dispenser housings 220 and 230. Therefore, such movement capabilities and structure will only be described in detail with respect to housing 220.

As shown in FIGS. 9 and 12, the dispenser housing shell 250 includes an inner horizontal support member 252 rigidly secured between the vertical side walls and end walls 253, 253*a* and 254, 254*a* of the shell 250. As mentioned above, holes 256 are contained in opposite end walls 254, 254*a* of the shell 250 for receiving a support tube 263 through the entire length of the shell 250 (FIG. 9). Pillow blocks 265, 266 rigidly connected to respective carriages 268, 269 support and suspend the support tube 263 and dispenser housing 220 by receiving reduced diameter ends 263*a*, 263*b* of the support tube 263. There are two points of attachment between the dispenser housing shell 250 and the support tube 263. These two attachment points include linear ways 270, 271 rigidly secured to the support tube 263 at opposite ends of the dispenser housing shell 250 and respective linear bearings 272, 273 which are rigidly secured to the horizontal support member 252 and slide along the respective linear ways 270, 271. The support tube 263 further includes an elongated slot 276 along a lower surface portion thereof to allow a rigid connection to be made between a push rod 274 extending through the tube 263 and the horizontal support member 252 of the dispenser housing shell 250. To this end, a connecting piece 275 is rigidly attached between the end of the push rod 274 within the support tube 263 and an upper surface of the horizontal support member 252. The connecting piece 275 extends through the elongated slot 276 in the support tube 263. The push rod 274 is moved back and forth by a reciprocating drive mechanism (to be described below) on carriage 268 in a direction parallel to the longitudinal axis of the support tube 263 in order to reciprocate the dispenser housing 220 back and forth along the support tube 263 by movement along the linear ways 270, 271.

Referring now to Fig, 10, the end of the push rod 274 opposite the connecting piece 275 is secured to a ball nut 277 received on a ball screw 278 mounted for rotation on carriage 268. The ball screw 278 is rotated by a servo motor 279 also mounted to the carriage 268 and having an output shaft which is operatively connected to one end of the ball screw 278 by a belt 280. The servo motor 279 is reversible and is operated by a conventional control system which may include a controller contained in control box 285 and which will continuously reverse the direction of the output shaft of the servo motor 279 such that the direction of rotation of the ball screw 278 and the resulting direction of movement of the dispenser housing 220 is continuously reversed to produce a reciprocating side-to-side motion of housing 220 along the support tube 263.

Preferably, when objects of constant width are being coated, the control system is programmed to cause the servo motor 279 to be continuously reversed after a predetermined constant number of rotations of the ball screw 278 which correspond to the predetermined proper stroke length of the housing 220. The use of a servo operated reciprocation mechanism, however, also allows significant flexibility and instantaneous variation in the reciprocative movements of the housing 220. In this regard, one advantage of the second embodiment of the invention over the first embodiment is that the reciprocation stroke length and/or speed of the dispenser housing 220 may be changed "on the fly" or, in other words, during the reciprocating or oscillating motion of the dispenser housing shell 250 along the longitudinal axis of the support tube 263. Specifically, it is contemplated that a suitable control system and program be used to reverse the direction of the servo motor 279 at different times during different parts of a powder spray coating operation to thus produce an oscillation or reciprocation stroke which changes in length and speed according to the change in width of an object passing underneath the dispenser housings 220, 230. Thus, the control system will operate the servo motor 279 so as to produce a longer reciprocation or oscillation stroke when the width of the object passing underneath the dispenser housings 220, 230 is greater and a shorter oscillation or reciprocation stroke when the width of the object passing underneath the dispenser housings 220, 230 is smaller. Of course, conventional programming techniques may be used to cause the oscillation stroke to change exactly with gradual or abrupt changes in the width of the object passing underneath the housings 220, 230.

Turning to FIG. 9, the apparatus 210 further includes a safety back-up to the programmable control system used to operate the reciprocating drive and specifically the servo motor 279. More particularly, a pair of limit switches 282, 283 are mounted to the carriage 268 to operate at positions just outside the outer limits of the particular reciprocation or oscillation stroke of the dispenser housings 220, 230 in a given application. A trip lever 284 is connected to the ball nut 277 and moves therewith to engage the lever arms 282*a*, 283*a* of the respective limit switches 282, 283 should there be a control system failure such as a software failure which causes the one or both of the housings 220, 230 to travel past an outer stroke limit. The limit switches 282, 283 are operatively connected in a conventional manner to the control system such that they cause the servo motor 279 to stop and the operator to be notified by, for example, and alarm and/or an indicator lamp (not shown).

As further shown in FIG. 9, a pair of vertical support units 290, 291 are provided for each dispenser housing 220, 230 to both suspend the dispenser housings 220, 230 above the objects to be coated and to provide for vertical movement of the dispenser housings 220, 230 with respect to the objects passing underneath. It should be noted that for maintenance and space considerations the reciprocating drive mechanism including the ball screw 278, servo motor 279, etc., for the first dispenser housing 220 is mounted on carriage 268, and vertical support unit 290 on one side of the spray chamber 217 while the reciprocating drive mechanism for the second dispenser housing 230 is mounted on an identical carriage 268 but on the vertical support unit 291 on the other side of the spray chamber 217 (see FIG. 10). This also allows space for pitch or toeing drives for the respective housings 220, 230 mounted on the vertical support units 290, 291 opposite to the respective reciprocating drive mechanisms.

The vertical support units 290, 291 of the second embodiment are similar in construction to the vertical support units 40, 42 of the first embodiment in that they are each comprised of a vertical column 292 mounted to a base 293 and further being held in an upright position by an angled brace member 294. Like the first embodiment, each vertical column 292 includes linear ways 297, 298 which receive suitable linear bearing units (not shown) connected to the respective carriages 268, 269. Each vertical support unit 290, 291 further includes a ball screw 299 which receives a ball nut (not shown) rigidly secured to each respective carriage 268, 269 as in the first embodiment. Also, in a manner similar to the first embodiment, chains 287 are attached to the respective carriages 268, 269, extend over sprockets 288 on each column 292 and have their opposite ends attached to counter weights 289 which aid in moving the carriages 268, 269 vertically along the columns 292.

The essential difference between the vertical support units 290, 292 of the second embodiment and the vertical support units 40, 42 of the first embodiment is that a servo motor 300 is used to rotate each respective ball screw 299 in an independent manner instead of having one motor operatively connected to both ball screws through a gear system such as the one shown in FIG. I of the first embodiment. As will be further explained below, the use of separate servo motors 300 to independently rotate the ball screws 299 allows for independent height adjustment of each carriage 268, 269 to pivot the support tube 263 in the direction indicated by arrows 308, 309 and effectively cause a concave spray pattern to be established to correspond to convexly shaped objects passing underneath the dispenser housings 220, 230. This pivoting action of the support tube 263 is allowed by the pillow blocks 265, 266 which allow approximately 15° of pivoting movement to occur. Universal joints or other types of joints and supports may also be used in place of or in conjunction with the pillow blocks 265, 266.

Referring now to FIG. 13, each of the carriages 268 for dispenser housings 220, 230 includes a separate limit switch 303 having a lever arm 304 which engages a cam 306 rigidly secured to the reduced diameter portion 263a of the respective support tube 263. The cam 306 includes a cam surface 307 which trips the lever arm 304 of the limit switch 303 when, for example, the dispenser housing 220 and the attached support tube 263 have been pivoted about the longitudinal axis of the support tube 263, Such pivoting of the support tube 263 would occur, for example, during a collision between any part of the dispenser housing 220, including the dispensers 221–226, and the object such as the pick-up truck body 211 passing through the booth in a leftward direction as viewed in FIG. 13. Once the lever arm 304 of the limit switch associated with either housing 220 or housing 230 has been tripped due to such a collision, the limit switch 303 sends a signal to the control system to initiate a high speed emergency retract program causing the housings 220, 230 and their associated dispensers 221–226, 231–235 to leap over the oncoming pick-up truck body 211 to prevent further significant damage to either the dispenser housings 220, 230 and their respective coating dispensers 221–226, 231–235 as well as to the pick-up truck body 211 passing underneath the coating dispensers 220, 230.

Coating Operation of the Second Embodiment

The operation and movement of the coating dispensers 220, 230 will be described in conjunction with their use in coating the upwardly facing surfaces of a pick-up truck bed 211a, however, it will be understood that the various maneuvering abilities of the coating dispenser housings 220, 230 as well as the coating dispensers 221–226 and 231–235 allow the apparatus of the second embodiment to be used to coat a wide variety of objects of various shapes and sizes.

Turning first to FIG. 9, the coating dispensers 221–226 of the first dispenser housing 220 as well as the coating dispensers 231–235 of the second coating dispenser housing 230 are shown lowered into the pick-up truck bed 211 a. Also, the pick-up truck body 211 has moved into the spray chamber 217 to a point at which the wheel wells 214 are directly below the second coating dispenser housing 230. In this position, the outer coating dispensers 221, 226 of the first dispenser housing 220 are approximately six inches above the horizontal upper side edges 212 of the truck bed 211 a while the inner coating dispensers 222–225 of the first coating dispenser housing 220 as well as the inner coating dispensers 232–234 of the second coating dispenser housing 230 are positioned approximately six inches above the floor 216 of the pickup truck bed 211a. In this regard, the dispenser housings 220, 230 are each initially lowered with respect to the front end of the moving bed 211a by lowering the carriages 268, 269 on each vertical support unit 290, 291 until the outer fixed coating dispensers 221, 226 are in their operative position above the side edges 212 of the moving truck bed 211a. All of the vertically adjustable coating dispensers 222–225 and 231–235 are then lowered by way of the respective rodless cylinders 229, 239, 244 and 245 into their operative position up to or within approximately six inches above the floor 216 of the moving pick-up truck bed 211a.

Once the coating dispensers 221–226 and 231–235 are in their operative lowered positions at the forward end of the pick-up truck bed 211a with the vehicle body 211 moving in a forward direction, i.e., leftwardly as viewed in FIGS. 12 and 13, the coating dispenser housings 220, 230 are reciprocated back and forth along the axes of their respective support tubes 263 in the manner previously described. This reciprocating motion ensures that powder coating material is evenly distributed on at least surfaces 212 and 216 of the pick-up truck bed 211a and, if the wheel wells 214 have not been previously coated through the use of a robotic painting arm, for example, the wheel wells 214 may be coated with coating dispensers 231 and 235.

Referring specifically to FIG. 11, as the wheel wells 214 approach the outer coating dispensers 231, 235 of the second coating dispenser 230, the respective rodless cylinders 244, 245 are actuated to lift the coating dispensers 231, 235 above the wheel wells 214 to the position illustrated in FIG. 11. If the wheel wells 214 have previously been coated, for example, by a robotic arm or other means or if they are to be coated by such means at a later time during the coating process, the coating dispensers 231, 235 are simultaneously shut off as they are lifted and until the wheel wells 214 pass and the dispensers 231, 235 are lowered into their operative positions six inches above the floor 216. If the dispensers 231, 235 are used to coat the wheel wells 214, then the coating dispensers 231, 235 are maintained at a constant distance above the upper arcuate surface of each respective wheel well 214 with this distance preferably being about six inches and being maintained until the coating dispensers 231, 235 are again at an operative position approximately six inches above the floor 216 of the pick-up truck bed 211a.

As mentioned briefly above, if at any point during the coating process either one or both of the coating dispenser housings 220, 230 or any of the coating dispensers 221–226 or 231–235 collides with any part of the vehicle body 211, the support tube 263 of either or both of the housings 220, 230 will pivot about its longitudinal axis within the pillow blocks 265, 266 and cause the cam surface 307 on the cam 306 to activate the limit switch 303 by tripping the limit switch lever arm 304. Activation of the limit switch 303 will then cause the control system to start an emergency high speed retract program which immediately lifts the housings 220, 230 to prevent significant damage to the apparatus 210 or the pick-up truck body 211.

The apparatus 210 of the second embodiment of the invention may also be used to evenly coat a convex upper surface of an object through the pivoting motion allowed by the pillow blocks 265, 266. In this regard, a conventional programmable control system would be used to operate the servo motors 300 to independently raise and lower the respective carriages 268, 269 and cause a pivoting motion of the coating dispenser housings 220, 230 in a plane perpendicular to the path of movement of the object or objects passing underneath the coating dispenser housings 220, 230 and in a direction indicated by arrows 308, 309 in FIG. 9. For example, even with the lower ends of each of the coating dispensers 221–226 and 231–235 each being even or at the same height as one another, the pivoting action caused by the controlled independent movement of the carriages 268, 269 will cause the effective spray pattern to take on a concave shape across the width of the object being coated to thus correspond with an outer surface of the object which is convexly shaped in a direction transverse to the object's path of movement through the spray booth.

Many modifications and substitutions in either of the two embodiments detailed above may be made by those of ordinary skill in the art. Specifically, it will be appreciated that many of the design aspects of the first embodiment may be easily substituted into the second embodiment and vice versa. Also, with respect to the second embodiment, any number of coating dispensers may be made vertically adjustable with respect to other coating dispensers depending on the specific application of the coating apparatus 210.

In addition, many modifications may be made to adapt a particular situation or material to the teachings of the invention without departing from the essential scope thereof.

Moreover, although two dispenser housings are employed in each illustrated embodiment to apply powder coating material onto the horizontally oriented surfaces of a vehicle body 30 and pick-up truck bed 211a, it should be understood that essentially any number of dispenser housings could be employed, each mounting a desired number of coating dispensers, and that the location of such dispenser housings need not necessarily be confined to the overhead area of the spray booth. Also, it is contemplated that the illustrated shapes for the dispenser housings of the first and second embodiments would be useful at other locations within spray booth.

It is therefore intended that the invention not be limited to the particular embodiments disclosed as the best mode contemplated for carrying out this invention, but that the invention will include all embodiments falling within the scope of the appended claims.

We claim:

1. Apparatus for applying coating material onto objects comprising:

a spray booth;

a housing formed with an outer surface, said outer surface having a shape which, with said housing located within an interior of the spray booth, promotes substantially laminar flow of air adjacent to and below said housing; and at least one coating dispenser mounted to said housing in position such that with said housing located within the spray booth said at least one coating dispenser is effective to dispense coating material onto objects moving through the interior of the spray booth.

2. The apparatus of claim 1 in which said outer surface of said housing includes an arcuate-shaped leading edge, a trailing edge and opposed sides extending between said leading and trailing edges.

3. The apparatus of claim 2 in which said opposed sides of said housing are each formed in a generally convexly curved shape along at least a portion of a length thereof.

4. The apparatus of claim 3 wherein said opposed sides taper inwardly proximate said trailing edge.

5. The apparatus of claim 1 in which said housing comprises:

a plurality of longitudinally spaced ribs;

first and second longitudinally extending spars which are spaced from one another;

means for interconnecting said first and second spars and for supporting said ribs; and an outer skin connected to said ribs.

6. The apparatus of claim 5 in which said at least one coating dispenser comprises:

a dispenser body mounted to one of said first and second spars, said dispenser body being formed with a coating delivery passageway for transmitting coating material;

a nozzle mounted to said dispenser body in communication with said coating delivery passageway; and, means carried by said dispenser body for electrostatically charging coating material discharged from said nozzle.

7. The apparatus of claim 6 wherein said means for electrostatically charging the coating material comprises:

an electrode assembly carried by the dispenser body in a position proximate a discharge outlet of the nozzle; and a dielectric block carried within a bore of the dispenser body and electrically connected to the electrode assembly at one end and an electrostatic cable at the other.

8. The apparatus of claim 7 wherein said electrostatic cable is disposed within a dielectric tube extending from the bore to a mounting block, wherein the dielectric block comprises a plurality of resistors potted together; and, a means for forcing the electrostatic cable into electrical contact with one of the resistors.

9. The apparatus of claim 1 in which said housing is formed with a hollow interior and includes means for mounting a coating material supply line within said hollow interior for directing coating material to said coating dispenser.

10. The apparatus of claim 1 wherein said at least one coating dispenser is mounted so as to be substantially completely encased by said housing.

11. Apparatus for coating objects comprising:

a spray booth:

a first housing having an outer surface including a leading edge, a trailing edge and side walls extending between said leading and trailing edges;

means for mounting said housing within an interior of said spray booth in the path of a flow of air therethrough within which oversprayed coating material is entrained for collection, said outer surface of said housing having a shape which promotes substantially laminar air flow adjacent to and below said housing; and means for mounting at least one coating dispenser to said housing in a position to dispense coating material onto objects moving through the spray booth.

12. The apparatus of claim 11 in which said outer surface of said housing includes an arcuate-shaped leading edge, a trailing edge and opposed sides extending between said leading and trailing edges.

13. The apparatus of claim 12 in which said opposed sides of said housing are each formed in a generally convexly arcuate shape along at least a portion of an length thereof.

14. The apparatus of claim 12 wherein said opposed sides taper inwardly proximate said trailing edge.

15. The apparatus of claim 11 in which said housing is formed with a hollow interior, and includes means for mounting a coating supply line within said hollow interior for directing coating material to said at least one coating dispenser.

16. The apparatus of claim 11 in which said housing comprises:
 a plurality of longitudinally spaced ribs;
 first and second longitudinally extending spars which are spaced from one another;
 means for interconnecting said first and second spars and for supporting said ribs; and,
 an outer skin connected to said ribs.

17. The apparatus of claim 16 in which said means for mounting at least one coating dispenser comprises:
 a dispenser body mounted to one of said first and second spars, said dispenser body being formed with a coating delivery passageway for transmitting coating material;
 a nozzle mounted to said dispenser body in communication with said coating delivery passageway; and,
 means carried by said dispenser body for electrostatically charging coating material discharged from said nozzle, 18. The apparatus of claim 11 in which said means for mounting said housing within the interior of said spray booth comprises:
 first and second spaced column supports each located outside of said interior of said spray booth;
 a first carriage mounted to said first column support, and a second carriage mounted to said second column support;
 a support rod connected between said first and second carriages, said support rod carrying said housing;
 first means for moving each of said carriages, and in turn said support rod and said housing, relative to said column supports along a first axis;
 second means connected to at least one of said carriages for moving said support rod, and in turn said housing, along a second axis which is substantially perpendicular to said first axis; and,
 third means connected to at least one of said carriages for pivoting said support rod, and in turn said housing, about one of said first and second axes.

19. The apparatus of claim 18 in which said first means comprises:
 a rotatable ball screw carried by each of said column supports;
 a nut mounted to each of said carriages and engageable with said ball screw; and,
 means for rotating said ball screw so that said nut and said carriages are moved along said ball screw relative to said column supports.

20. The apparatus of claim 18 in which said third means comprises:
 a motor mounted to one of said first and second carriages, said motor having an output shaft; and,
 means for connecting said output shaft to said support rod, said output shaft being effective to rotate said support rod, and in turn said housing.

21. The apparatus of claim 18 in which said support rod is formed with gear teeth along at least a portion of an external surface thereof, said second means comprising:
 a motor;
 a tube having gear teeth along at least a portion of the external surface thereof, said tube being carried within a cylinder;
 means drivingly connecting said motor and said tube for moving said tube axially relative to said cylinder; and,
 gear means connected between said gear teeth of said tube and said gear teeth of said support rod for moving said support rod, and in turn said housing, along said second axis in response to axial movement of said tube, 22. The apparatus of claim 11 wherein said means for mounting said housing mounts said housing so that said leading edge is first to contact the flow of air moving through said spray booth and wherein said at least one coating dispenser is mounted to said trailing edge.

23. The apparatus of claim 11 further comprising:
 a second housing having an outer surface including a leading edge, a trailing edge and side walls extending between said leading and trailing edges;
 means for mounting said second housing within the interior of the spray booth in the path of a flow of air therethrough within which oversprayed coating material is entrained for collection, said outer surface of said second housing promoting substantially laminar air flow adjacent to and below said second housing;
 means for mounting at least one coating dispenser to said second housing in a position to dispense coating material onto objects moving through the spray booth.

24. The apparatus of claim 23 in which said first and second housings are spaced from one another in a first direction of movement of objects through the spray booth.

25. The apparatus of claim 24 wherein said at least one coating dispenser for both said first and second housings comprises a plurality of coating dispensers, said plurality of coating dispensers of said second housing being offset from said plurality of coating dispensers of said first housing in a direction perpendicular to said first direction of movement of objects through the spray booth.

26. The apparatus of claim 23 wherein said means for mounting said at least one coating dispenser to said first and second housings mounts said at least one coating dispenser so as to be substantially completely encased respectively by said first and second housings.

27. The apparatus of claim 11 wherein said at least one coating dispenser is mounted so as to be substantially completely encased by said housing.

28. Apparatus for coating objects, said apparatus comprising:
 a spray booth having a spray application area;
 a coating dispenser support disposed within said spray application area, said coating dispenser support extending between a pair of vertical support units;
 at least one coating dispenser mounted to said coating dispenser support for dispensing coating material onto objects within said spray application area;
 a first drive mechanism mounted to one of said vertical supports and operatively connected to said coating dispenser support for moving said coating a dispenser support with respect to said vertical support units;
 a pair of seals, each respective seal being disposed between a vertical support unit and one end of said coating dispenser support for isolating said vertical support units and said first drive mechanism from said spray application area.

29. The apparatus of claim 28 wherein said first drive mechanism comprises a reciprocating mechanism connected to said coating dispenser support for moving said coating dispenser support side-to-side between said vertical support units.

30. The apparatus of claim 29 wherein said coating dispenser support is mounted for vertical movement along said vertical support units and further comprising a second drive mechanism mounted to one of said vertical support units for moving said coating dispenser support vertically between said vertical support units, said seals being moveable with said coating dispenser support to isolate said first and second drive mechanisms and said vertical support units from said spray application area, 31. The apparatus of claim 30 wherein said coating dispenser support further comprises a support bar connected to said second drive mechanism and mounted for vertical movement between said vertical support units and said movable seals each comprise a flexible sheet which surrounds said support bar and wherein each seal is operative to move vertically with said support bar to maintain a seal between each respective vertical support unit and said spray application area.

32. The apparatus of claim 28 wherein said coating dispenser support is mounted for vertical movement along said vertical support units and further comprising a second drive mechanism mounted to one of said vertical support units for moving said coating dispenser support vertically between said vertical support units, said seals being moveable with said coating dispenser support to isolate said first and second drive mechanisms and said vertical support units from said spray application area, 33. The apparatus of claim 28 wherein said coating dispenser support further comprises:

a housing mounting said at least one coating dispenser: and a support tube extending into said housing from said vertical support units for supporting said housing between said vertical support units, wherein coating dispenser supply tubes for operating said at least one coating dispenser extend into said housing through said support tube such that said supply tubes are isolated from said spray application area.

34. The apparatus of claim 33, wherein said at least one coating dispenser includes a dispenser nozzle for discharging powder coating material and an electrostatic charging device mounted adjacent said nozzle for imparting an electrostatic charge to said powder as said powder is discharged from said nozzle, wherein cables for operating the electrostatic charging device extend into said housing through said hollow support tube means such that said cables are isolated from said spray application area.

35. The apparatus of claim 28 wherein said at least coating dispenser comprises a plurality of coating dispensers mounted to said coating dispenser support.

36. Apparatus for mounting and moving coating objects, said apparatus comprising:

a pair of vertical support units;

a spray booth:

a housing mounted between said support units within said spray booth and formed with an outer surface said outer surface having a shape which, with said housing located within an interior of the pray booth, promotes substantially laminar flow air adjacent to and below said housing;

at least one coating dispenser mounted to said housing for coating an object and mounted for side-to-side movement in a predetermined stroke length between said vertical support units; and, a first drive mechanism operatively connected to said at least one coating dispenser for reciprocating said coating dispenser in a side-to-side manner between said vertical support units, said drive mechanism including a reversible motor and a drive connection between said motor and said coating dispenser, wherein said drive connection allows forward and reverse operation of said motor to reciprocate said coating dispenser side-to-side and allows said predetermined stroke length to be changed by changing the extent of said forward and reverse operation in correspondence with dimensional changes in said objects moving relative thereto.

37. The apparatus of claim 34 further comprising:

a coating dispenser support mounted between said vertical support units and having said at least one coating dispenser mounted thereto;

a ball screw coupled to said reversible motor for rotation in forward and reverse directions therewith; and, a ball nut received on said ball screw for translation along said ball screw upon rotation thereof, said ball nut being operatively connected to said coating dispenser support for reciprocating said coating dispenser support and said at least one coating dispenser in said side-to-side manner in response to forward and reverse operation of said motor.

38. The apparatus of claim 37 wherein said coating dispenser support further comprises:

a support tube extending between said vertical support units; and, a housing mounted for sliding movement along said support tube, said at least one coating dispenser being mounted to said housing;

wherein a push rod is connected to said ball nut, extends through said support tube, and is attached through an opening in said support tube to said housing so as to move said housing along said support tube according to the movement of said ball nut along said ball screw, 39. The apparatus of claim 36 wherein said at least one coating dispenser comprises a plurality of coating dispensers mounted between said vertical support units.

40. Apparatus for mounting and moving coating objects, said apparatus comprising:

pair of vertical support units;

spray booth:

housing mounted foe vertical movement between said support units within said spray booth and formed with an outer surface, said outer surface having a shade which with said housing located within an interior of the spray booth, promotes substantially laminar flow of air adjacent to and below said housing:

a drive unit operatively connected to said housing for moving said housing vertically along said support units;

a plurality of coating dispensers mounted to said housing, at least one of said coating dispensers being mounted for vertical movement relative to said housing; and, an actuator connected to said at least one coating dispenser for moving said coating dispenser vertically relative to said housing.

41. The apparatus of claim 40 wherein said at least one coating dispenser further comprises a plurality of coating dispensers mounted on said housing in spaced relation along said housing for vertical movement as a unit relative to said housing.

42. The apparatus of claim 41 further comprising two outer coating dispensers rigidly mounted to said housing in spaced relation with and outside of said plurality of coating dispensers.

43. The apparatus of claim 41 wherein two outer coating dispensers are mounted to said housing for vertical movement relative to both said housing and said plurality of coating dispensers and in spaced relation with and outside of the two outermost dispensers of said plurality of coating dispensers.

44. The apparatus of claim 40 wherein said housing is in fluid communication with a source of positive pressure, whereby positive pressure in said housing prevents coating material from entering said housing.

45. Apparatus for coating objects, said apparatus comprising:

first and second vertical support units;

a coating dispenser support mounted for pivotal and vertical movement between said first and second vertical support units;

at least one coating dispenser mounted to said coating dispenser support;

a first drive unit operatively connected to said coating dispenser support for moving a first end of said coating dispenser support vertically along said first support unit; and a second drive unit operatively connected to said coating dispenser support for moving a second end of said coating dispenser support vertically along said second support unit and independently of the movement of said first end of said coating dispenser support.

46. The apparatus of claim 45 wherein said coating dispenser support further comprises a support bar mounted at opposite ends thereof to said vertical support units, the opposite ends of said support bar each being mounted within pillow blocks which allow a predetermined amount of pivoting motion of said support bar about an axis generally perpendicular to along longitudinal axis of said support bar.

47. Apparatus for applying coating material onto objects comprising:

a spray booth;

a housing formed with an outer surface, said outer surface including an arcuate curved leading edge against which a flow of air is directed within the spray booth, said leading edge being connected to a pair of side walls for promoting substantially laminar air flow adjacent to and below said housing; and, at least one coating dispenser mounted to said housing in a position such that with said housing located within the spray booth said at least one coating dispenser is effective to dispense coating material onto objects moving through an interior of the spray booth.

48. The apparatus of claim 47 wherein said side walls are flat and are connected by a flat bottom wall which is substantially perpendicular to said side walls.

49. The apparatus of claim 47 wherein said housing is slidably supported on a support rod adapted to be mounted within the interior of said spray booth, said housing further being connected to a reciprocating drive mechanism for moving said housing back and forth along said support rod.

50. The apparatus of claim 49 wherein said support rod is mounted at opposite ends thereof to a pair of vertical support units, said reciprocating drive mechanism being mounted on one of said vertical support units and being connected to a push rod extending substantially parallel to a longitudinal axis of said support rod and having an end thereof attached to said housing such that said push rod moves said housing along said support rod in response to operation of said reciprocating drive mechanism.

51. The apparatus of claim 50 further comprising:

a pair of carriages, one of said carriages being mounted on each respective vertical support unit so as to allow vertical movement therealong; and, a vertical drive system for moving said carriages along said vertical support units;

wherein said reciprocating drive mechanism is mounted to one of said carriages.

52. The apparatus of claim 50 wherein said support rod is a hollow tube, said push rod extending through a hollow interior of said tube and being attached to said housing through an elongate opening in the outer surface of the tube.

53. The apparatus of claim 52 wherein said reciprocating drive mechanism comprises a reversible motor coupled to a ball screw, said ball screw receiving a ball nut which is rigidly secured to said push rod such that operation of said motor rotates said ball screw to cause translation of said ball nut and said push rod.

54. The apparatus of claim 47 further comprising a support bar connected to said housing and mounted between a pair of vertical support units such that it may pivot in a direction perpendicular to a path of movement of objects through the booth and a switch operatively connected to said support bar, said switch being activated upon pivotal movement of said support bar and activation of said switch being operative to lift said housing and support bar and said at least one coating dispenser away from said object.

55. The apparatus of claim 47 wherein said at least one coating dispenser comprises:

a plurality of coating dispensers mounted to said housing, at least one of said coating dispensers being mounted for vertical movement relative to said housing; and, an actuator connected to said at least one coating dispenser for moving said coating dispenser vertically relative to said housing.

56. The apparatus of claim 55 wherein said housing is in fluid communication with a source of positive pressure, whereby positive pressure in said housing prevents coating material from entering said housing.

57. The apparatus of claim 55 wherein said at least one coating dispenser further comprises a plurality of coating dispensers mounted to said housing in spaced relation along a lower edge of said housing for vertical movement as a unit relative to said housing, 58. The apparatus of claim 57 further comprising two outer coating dispensers rigidly mounted to said housing in spaced relation with and outside of said plurality of coating dispensers.

59. The apparatus of claim 57 wherein two outer coating dispensers are mounted to said housing for vertical movement relative to both said housing and said plurality of coating dispensers and in spaced relation with and outside of the two outermost dispensers of said plurality of coating dispensers.

60. Apparatus for mounting coating objects, said apparatus comprising:

a spray booth;

a pair of vertical support units;

a coating dispenser support mounted within an interior of said spray booth between said pair of vertical support units along an axis, said coating dispenser support being freely pivotal about said axis during a coating operation to thereby allow said coating dispenser support to rotate about said longitudinal axis upon collision with an object moving relative thereto during said coating operation; and, at least one coating dispenser mounted to said coating dispenser support for dispensing coating material onto objects moving relative to said at least one coating dispenser and said coating dispenser support.

61. The apparatus of claim 60 further comprising:

a switch operatively connected to said coating dispenser support such that said switch is activated upon pivotal movement of said coating dispenser support.

62. The apparatus of claim 61 further comprising a control system, said control system being responsive to activation of said switch to cause retraction of said coating dispenser support and said coating dispenser away from said objects being coated.

63. The apparatus of claim 61 wherein said switch is a limit switch having a lever arm for activation thereof, said support rod including a cam surface adapted to engage said lever arm upon pivoting motion of said support rod.

64. The apparatus of claim 60 wherein said coating dispenser support comprises a support rod having said longitudinal axis, said support rod mounted in bearing units at opposite ends thereof which allow pivoting of said support rod about said longitudinal axis.

65. The apparatus of claim 60 wherein said at least one coating dispenser comprises a plurality of coating dispensers are mounted to said coating dispenser support.

* * * * *

UNITED STATES PATENT AND TRADEMARK OFFICE
CERTIFICATE OF CORRECTION

PATENT NO. : 5,482,556
DATED : January 9, 1996
INVENTOR(S) : Jeffrey R. Shutic et al.

It is certified that error appears in the above-indentified patent and that said Letters Patent is hereby corrected as shown below:

Col. 14, line 44, delete "1/8-1/4" and insert -- 1/8"-1/4" -- therefor.

Col. 21, line 21, after "mounting" insert -- said --.
Col. 22, line 63, after "coating" delete "a".
Col. 22, line 64, after "units;" insert -- and --.
Col. 23, line 53, before "support" delete "hollow".
Col. 23, line 55, after "least" insert -- one --.
Col. 23, line 58, delete "mounting and moving".
Col. 23, line 66, delete "pray" and insert -- spray -- therefor.
Col. 24, line 45, delte "mounting and moving".
Col. 24, line 48, before "pair" insert -- a --.
Col. 24, line 49, before "spray" insert -- a --.
col. 24, line 50, before "housing" insert -- a --.
Col. 24, line 50, delete "foe" and insert -- for -- therefor.
Col. 24, line 52, delete "shade" and insert -- shape -- therefor.
Col. 25, line 40, after "to" delete "along".
Col. 25, line 60, after "rod" delete "adapted to be".
Col. 26, line 60, after "for" delete "mounting".
Col. 28, line 4, after "thereof" insert --and said coating dispenser support comprises a support rod --.

UNITED STATES PATENT AND TRADEMARK OFFICE
CERTIFICATE OF CORRECTION

PATENT NO. : 5,482,556
DATED : January 9, 1996
INVENTOR(S) : Jeffrey R. Shutic, et. al.

It is certified that error appears in the above-indentified patent and that said Letters Patent is hereby corrected as shown below:

Col. 28, line 15, delete "are" before "mounted".

Signed and Sealed this

Twenty-sixth Day of November 1996

Attest:

BRUCE LEHMAN

Attesting Officer   Commissioner of Patents and Trademarks